(12) United States Patent
Hong et al.

(10) Patent No.: US 10,594,743 B2
(45) Date of Patent: Mar. 17, 2020

(54) METHOD, APPARATUS, AND SYSTEM FOR IMPLEMENTING A CONTENT SWITCH

(71) Applicant: Nicira, Inc., Palo Alto, CA (US)

(72) Inventors: Xinhua Hong, Milpitas, CA (US);
Jayant Jain, Cupertino, CA (US);
Anirban Sengupta, Saratoga, CA (US)

(73) Assignee: NICIRA, INC., Palo Alto, CA (US)

( * ) Notice: Subject to any disclaimer, the term of this patent is extended or adjusted under 35 U.S.C. 154(b) by 181 days.

(21) Appl. No.: 14/813,643

(22) Filed: Jul. 30, 2015

(65) Prior Publication Data

US 2016/0294935 A1    Oct. 6, 2016

Related U.S. Application Data

(60) Provisional application No. 62/142,876, filed on Apr. 3, 2015.

(51) Int. Cl.
*G06F 15/16* (2006.01)
*H04L 29/06* (2006.01)
(Continued)

(52) U.S. Cl.
CPC ............ *H04L 65/1069* (2013.01); *G06F 9/00* (2013.01); *H04L 47/125* (2013.01);
(Continued)

(58) Field of Classification Search
CPC .......................... H04L 65/1069; H04L 67/288
(Continued)

(56) References Cited

U.S. PATENT DOCUMENTS 6,006,264 A    12/1999 Colby et al.
6,104,700 A    8/2000 Haddock et al.
(Continued)

FOREIGN PATENT DOCUMENTS

CN    1689369 A    10/2005
CN    103795805 A    5/2014
(Continued)

OTHER PUBLICATIONS

Author Unknown, "Enabling Service Chaining on Cisco Nexus 1000V Series," Month Unknown, 2012, 25 pages, CISCO.
(Continued)

*Primary Examiner* — Kevin T Bates
*Assistant Examiner* — Clarence D McCray
(74) *Attorney, Agent, or Firm* — Adeli LLP

(57) ABSTRACT

Some embodiments provide a novel content switching method that distributes requests for different types of content to different sets of content servers. In some embodiments, the method deploys a content switch in the ingress data path of a first content server that is part of a first set of servers that processes requests for a first type of content. This content switch receives each content request that is directed to the first content server, and determines whether the received request is for the first content type that is processed by the first content server. If so, the content switch directs the request to the first content server. On the other hand, if the request is for a second type of content that is processed by a second set of servers, the content switch identifies a second content server in the second set and forwards the request to the second content server. When the second set of servers includes two or more servers, the content switch in some embodiments performs a load balancing operation to distribute the load amongst the servers in the second set. For each request, the load balancing operation in some embodiments selects one server from the second server set based on a set of load balancing criteria that specifies one manner for distributing the requests among the servers of the second set, and then forwards the request to the selected server.

22 Claims, 9 Drawing Sheets

(51) Int. Cl.
*H04L 12/803* (2013.01)
*H04L 29/08* (2006.01)
*G06F 9/00* (2006.01)
*H04L 12/24* (2006.01)

(52) U.S. Cl.
CPC ........ *H04L 67/1014* (2013.01); *H04L 67/288* (2013.01); *H04L 67/327* (2013.01); *H04L 41/08* (2013.01); *H04L 67/1004* (2013.01)

(58) Field of Classification Search
USPC ..................................................... 709/217
See application file for complete search history.

(56) References Cited

U.S. PATENT DOCUMENTS

| | | | |
|---|---|---|---|
| 6,772,211 B2 | 8/2004 | Lu et al. | |
| 6,880,089 B1 | 4/2005 | Bommareddy et al. | |
| 6,985,956 B2 * | 1/2006 | Luke | G06F 11/2089 709/216 |
| 7,013,389 B1 | 3/2006 | Srivastava et al. | |
| 7,209,977 B2 | 4/2007 | Acharya et al. | |
| 7,379,465 B2 | 5/2008 | Aysan et al. | |
| 7,406,540 B2 | 7/2008 | Acharya et al. | |
| 7,447,775 B1 * | 11/2008 | Zhu | H04N 21/23439 709/217 |
| 7,480,737 B2 | 1/2009 | Chauffour et al. | |
| 7,487,250 B2 | 2/2009 | Siegel | |
| 7,649,890 B2 | 1/2010 | Mizutani et al. | |
| 7,818,452 B2 | 10/2010 | Matthews et al. | |
| 7,898,959 B1 | 3/2011 | Arad | |
| 7,948,986 B1 | 5/2011 | Ghosh et al. | |
| 8,078,903 B1 | 12/2011 | Parthasarathy et al. | |
| 8,175,863 B1 | 5/2012 | Ostermeyer et al. | |
| 8,190,767 B1 | 5/2012 | Maufer et al. | |
| 8,201,219 B2 | 6/2012 | Jones | |
| 8,223,634 B2 | 7/2012 | Tanaka et al. | |
| 8,230,493 B2 | 7/2012 | Davidson et al. | |
| 8,266,261 B2 | 9/2012 | Akagi | |
| 8,451,735 B2 | 5/2013 | Li | |
| 8,484,348 B2 | 7/2013 | Subramanian et al. | |
| 8,521,879 B1 | 8/2013 | Pena et al. | |
| 8,615,009 B1 | 12/2013 | Ramamoorthi et al. | |
| 8,743,885 B2 | 6/2014 | Khan et al. | |
| 8,811,412 B2 | 8/2014 | Shippy | |
| 8,830,834 B2 | 9/2014 | Sharma et al. | |
| 8,832,683 B2 | 9/2014 | Heim | |
| 8,849,746 B2 | 9/2014 | Candea et al. | |
| 8,856,518 B2 | 10/2014 | Sridharan et al. | |
| 8,862,883 B2 | 10/2014 | Cherukuri et al. | |
| 8,868,711 B2 | 10/2014 | Skjolsvold et al. | |
| 8,873,399 B2 | 10/2014 | Bothos et al. | |
| 8,892,706 B1 | 11/2014 | Dalal | |
| 8,914,406 B1 | 12/2014 | Haugsnes et al. | |
| 8,971,345 B1 | 3/2015 | McCanne et al. | |
| 8,989,192 B2 | 3/2015 | Foo et al. | |
| 8,996,610 B1 * | 3/2015 | Sureshchandra | G06F 17/30286 705/1.1 |
| 9,094,464 B1 * | 7/2015 | Scharber | H04L 45/026 |
| 9,104,497 B2 | 8/2015 | Mortazavi | |
| 9,148,367 B2 | 9/2015 | Kandaswamy et al. | |
| 9,191,293 B2 | 11/2015 | Iovene et al. | |
| 9,225,638 B2 | 12/2015 | Jain et al. | |
| 9,225,659 B2 | 12/2015 | McCanne et al. | |
| 9,232,342 B2 | 1/2016 | Seed et al. | |
| 9,264,313 B1 | 2/2016 | Manuguri et al. | |
| 9,277,412 B2 | 3/2016 | Freda et al. | |
| 9,397,946 B1 | 7/2016 | Yadav | |
| 9,407,599 B2 | 8/2016 | Koponen et al. | |
| 9,479,358 B2 | 10/2016 | Klosowski et al. | |
| 9,503,530 B1 | 11/2016 | Niedzielski | |
| 9,531,590 B2 | 12/2016 | Jain et al. | |
| 9,602,380 B2 | 3/2017 | Strassner | |
| 9,686,192 B2 | 6/2017 | Sengupta et al. | |
| 9,686,200 B2 | 6/2017 | Pettit et al. | |
| 9,755,898 B2 | 9/2017 | Jain et al. | |
| 9,755,971 B2 | 9/2017 | Wang et al. | |
| 9,774,537 B2 | 9/2017 | Jain et al. | |
| 9,787,605 B2 | 10/2017 | Zhang et al. | |
| 9,804,797 B1 | 10/2017 | Ng et al. | |
| 9,825,810 B2 | 11/2017 | Jain et al. | |
| 9,860,079 B2 | 1/2018 | Cohn et al. | |
| 9,900,410 B2 | 2/2018 | Dalal | |
| 9,935,827 B2 | 4/2018 | Jain et al. | |
| 9,979,641 B2 | 5/2018 | Jain et al. | |
| 9,985,896 B2 | 5/2018 | Koponen et al. | |
| 10,075,470 B2 | 9/2018 | Vaidya et al. | |
| 10,079,779 B2 | 9/2018 | Zhang et al. | |
| 10,104,169 B1 | 10/2018 | Moniz et al. | |
| 10,129,077 B2 | 11/2018 | Jain et al. | |
| 10,129,180 B2 | 11/2018 | Zhang et al. | |
| 10,135,737 B2 | 11/2018 | Jain et al. | |
| 10,225,137 B2 | 3/2019 | Jain et al. | |
| 10,257,095 B2 | 4/2019 | Jain et al. | |
| 10,320,679 B2 | 6/2019 | Jain et al. | |
| 10,341,233 B2 | 7/2019 | Jain et al. | |
| 2002/0097724 A1 | 7/2002 | Halme et al. | |
| 2002/0194350 A1 | 12/2002 | Lu et al. | |
| 2003/0065711 A1 | 4/2003 | Acharya et al. | |
| 2003/0093481 A1 | 5/2003 | Mitchell et al. | |
| 2003/0097429 A1 * | 5/2003 | Wu | G06F 17/30899 709/220 |
| 2003/0105812 A1 | 6/2003 | Flowers, Jr. et al. | |
| 2003/0236813 A1 * | 12/2003 | Abjanic | G06F 9/5044 718/102 |
| 2004/0066769 A1 | 4/2004 | Ahmavaara et al. | |
| 2004/0210670 A1 | 10/2004 | Anerousis et al. | |
| 2004/0215703 A1 * | 10/2004 | Song | G06F 9/5033 709/201 |
| 2005/0091396 A1 | 4/2005 | Nilakantan et al. | |
| 2005/0114429 A1 | 5/2005 | Caccavale | |
| 2005/0132030 A1 | 6/2005 | Hopen et al. | |
| 2005/0198200 A1 * | 9/2005 | Subramanian | H04L 41/50 709/218 |
| 2005/0249199 A1 | 11/2005 | Albert et al. | |
| 2006/0069776 A1 | 3/2006 | Shim et al. | |
| 2006/0130133 A1 | 6/2006 | Andreev et al. | |
| 2006/0155862 A1 | 7/2006 | Kathi et al. | |
| 2006/0233155 A1 | 10/2006 | Srivastava | |
| 2007/0061492 A1 | 3/2007 | Van Riel | |
| 2007/0214282 A1 | 9/2007 | Sen | |
| 2008/0005293 A1 | 1/2008 | Bhargava et al. | |
| 2008/0031263 A1 | 2/2008 | Ervin et al. | |
| 2008/0046400 A1 | 2/2008 | Shi et al. | |
| 2008/0049614 A1 | 2/2008 | Briscoe et al. | |
| 2008/0049619 A1 | 2/2008 | Twiss | |
| 2008/0049786 A1 | 2/2008 | Ram et al. | |
| 2008/0072305 A1 | 3/2008 | Casado et al. | |
| 2008/0084819 A1 | 4/2008 | Parizhsky et al. | |
| 2008/0104608 A1 | 5/2008 | Hyser et al. | |
| 2008/0195755 A1 | 8/2008 | Lu et al. | |
| 2008/0225714 A1 | 9/2008 | Denis | |
| 2008/0239991 A1 | 10/2008 | Applegate et al. | |
| 2008/0247396 A1 | 10/2008 | Hazard | |
| 2008/0276085 A1 | 11/2008 | Davidson et al. | |
| 2008/0279196 A1 | 11/2008 | Friskney et al. | |
| 2009/0019135 A1 * | 1/2009 | Eswaran | H04L 12/4645 709/219 |
| 2009/0063706 A1 | 3/2009 | Goldman et al. | |
| 2009/0129271 A1 | 5/2009 | Ramankutty et al. | |
| 2009/0172666 A1 | 7/2009 | Yahalom et al. | |
| 2009/0199268 A1 | 8/2009 | Ahmavaara et al. | |
| 2009/0235325 A1 | 9/2009 | Dimitrakos et al. | |
| 2009/0265467 A1 | 10/2009 | Peles | |
| 2009/0299791 A1 | 12/2009 | Blake et al. | |
| 2009/0300210 A1 | 12/2009 | Ferris | |
| 2009/0303880 A1 | 12/2009 | Maltz et al. | |
| 2009/0307334 A1 | 12/2009 | Maltz et al. | |
| 2009/0327464 A1 | 12/2009 | Archer et al. | |
| 2010/0031360 A1 | 2/2010 | Seshadri et al. | |
| 2010/0036903 A1 | 2/2010 | Ahmad et al. | |
| 2010/0100616 A1 | 4/2010 | Bryson et al. | |
| 2010/0131638 A1 | 5/2010 | Kondamuru | |

(56) References Cited

U.S. PATENT DOCUMENTS

| | | |
|---|---|---|
| 2010/0223364 A1 | 9/2010 | Wei |
| 2010/0223621 A1 | 9/2010 | Joshi et al. |
| 2010/0235915 A1 | 9/2010 | Memon et al. |
| 2010/0265824 A1 | 10/2010 | Chao et al. |
| 2010/0281482 A1 | 11/2010 | Pike et al. |
| 2010/0332595 A1 | 12/2010 | Fullagar et al. |
| 2011/0010578 A1 | 1/2011 | Agúndez Dominguez et al. |
| 2011/0016348 A1 | 1/2011 | Pace et al. |
| 2011/0022695 A1 | 1/2011 | Dalal et al. |
| 2011/0022812 A1 | 1/2011 | van der Linden et al. |
| 2011/0035494 A1 | 2/2011 | Pandey et al. |
| 2011/0040893 A1 | 2/2011 | Karaoguz et al. |
| 2011/0055845 A1 | 3/2011 | Nandagopal et al. |
| 2011/0090912 A1 | 4/2011 | Shippy |
| 2011/0164504 A1 | 7/2011 | Bothos et al. |
| 2011/0211463 A1 | 9/2011 | Matityahu et al. |
| 2011/0225293 A1 | 9/2011 | Rathod |
| 2011/0235508 A1 | 9/2011 | Goel et al. |
| 2011/0261811 A1 | 10/2011 | Battestilli et al. |
| 2011/0268118 A1 | 11/2011 | Schlansker et al. |
| 2011/0276695 A1 | 11/2011 | Maldaner |
| 2011/0283013 A1 | 11/2011 | Grosser et al. |
| 2011/0295991 A1 | 12/2011 | Aida |
| 2011/0317708 A1 | 12/2011 | Clark |
| 2012/0005265 A1* | 1/2012 | Ushioda ............. H04L 12/2812 709/203 |
| 2012/0014386 A1 | 1/2012 | Xiong et al. |
| 2012/0023231 A1 | 1/2012 | Ueno |
| 2012/0054266 A1 | 3/2012 | Kazerani et al. |
| 2012/0089664 A1 | 4/2012 | Igelka |
| 2012/0137004 A1 | 5/2012 | Smith |
| 2012/0140719 A1 | 6/2012 | Hui et al. |
| 2012/0144014 A1 | 6/2012 | Natham et al. |
| 2012/0147894 A1 | 6/2012 | Mulligan et al. |
| 2012/0155266 A1 | 6/2012 | Patel et al. |
| 2012/0185588 A1 | 7/2012 | Error |
| 2012/0207174 A1 | 8/2012 | Shieh |
| 2012/0230187 A1 | 9/2012 | Tremblay et al. |
| 2012/0246637 A1 | 9/2012 | Kreeger et al. |
| 2012/0281540 A1 | 11/2012 | Khan et al. |
| 2012/0287789 A1 | 11/2012 | Aybay et al. |
| 2012/0303784 A1* | 11/2012 | Zisapel ................. G06F 9/505 709/223 |
| 2012/0303809 A1 | 11/2012 | Patel et al. |
| 2012/0317570 A1 | 12/2012 | Dalcher et al. |
| 2012/0331188 A1 | 12/2012 | Riordan et al. |
| 2013/0003735 A1 | 1/2013 | Chao et al. |
| 2013/0044636 A1 | 2/2013 | Koponen et al. |
| 2013/0058346 A1 | 3/2013 | Sridharan et al. |
| 2013/0073743 A1 | 3/2013 | Ramasamy et al. |
| 2013/0125120 A1 | 5/2013 | Zhang et al. |
| 2013/0136126 A1 | 5/2013 | Wang et al. |
| 2013/0142048 A1 | 6/2013 | Gross, IV et al. |
| 2013/0148505 A1 | 6/2013 | Koponen et al. |
| 2013/0151661 A1 | 6/2013 | Koponen et al. |
| 2013/0160024 A1 | 6/2013 | Shtilman et al. |
| 2013/0163594 A1 | 6/2013 | Sharma et al. |
| 2013/0170501 A1 | 7/2013 | Egi et al. |
| 2013/0201989 A1 | 8/2013 | Hu et al. |
| 2013/0227097 A1 | 8/2013 | Yasuda et al. |
| 2013/0227550 A1 | 8/2013 | Weinstein et al. |
| 2013/0332983 A1 | 12/2013 | Koorevaar et al. |
| 2013/0343378 A1 | 12/2013 | Veteikis et al. |
| 2014/0059204 A1 | 2/2014 | Nguyen et al. |
| 2014/0059544 A1 | 2/2014 | Koganty et al. |
| 2014/0068602 A1 | 3/2014 | Gember et al. |
| 2014/0092738 A1 | 4/2014 | Grandhi et al. |
| 2014/0092914 A1 | 4/2014 | Kondapalli |
| 2014/0101226 A1 | 4/2014 | Khandekar et al. |
| 2014/0115578 A1 | 4/2014 | Cooper et al. |
| 2014/0129715 A1 | 5/2014 | Mortazavi |
| 2014/0164477 A1 | 6/2014 | Springer et al. |
| 2014/0169168 A1 | 6/2014 | Jalan et al. |
| 2014/0169375 A1 | 6/2014 | Khan et al. |
| 2014/0195666 A1 | 7/2014 | Dumitriu et al. |
| 2014/0207968 A1 | 7/2014 | Kumar et al. |
| 2014/0254374 A1 | 9/2014 | Janakiraman et al. |
| 2014/0281029 A1 | 9/2014 | Danforth |
| 2014/0282526 A1 | 9/2014 | Basavaiah et al. |
| 2014/0301388 A1 | 10/2014 | Jagadish et al. |
| 2014/0304231 A1 | 10/2014 | Kamath et al. |
| 2014/0310391 A1 | 10/2014 | Sorenson, III et al. |
| 2014/0310418 A1 | 10/2014 | Sorenson, III et al. |
| 2014/0317677 A1 | 10/2014 | Vaidya et al. |
| 2014/0330983 A1 | 11/2014 | Zisapel et al. |
| 2014/0334485 A1 | 11/2014 | Jain et al. |
| 2014/0351452 A1 | 11/2014 | Bosch et al. |
| 2014/0362705 A1 | 12/2014 | Pan |
| 2014/0369204 A1 | 12/2014 | Anand et al. |
| 2014/0372567 A1 | 12/2014 | Ganesh et al. |
| 2014/0372616 A1 | 12/2014 | Arisoylu et al. |
| 2014/0372702 A1 | 12/2014 | Subramanyam et al. |
| 2015/0003453 A1 | 1/2015 | Sengupta et al. |
| 2015/0003455 A1 | 1/2015 | Haddad et al. |
| 2015/0009995 A1 | 1/2015 | Gross, IV et al. |
| 2015/0026345 A1 | 1/2015 | Ravinoothala et al. |
| 2015/0030024 A1 | 1/2015 | Venkataswami et al. |
| 2015/0052262 A1 | 2/2015 | Chanda et al. |
| 2015/0063364 A1 | 3/2015 | Thakkar et al. |
| 2015/0071301 A1 | 3/2015 | Dalal |
| 2015/0124840 A1 | 5/2015 | Bergeron |
| 2015/0146539 A1 | 5/2015 | Mehta et al. |
| 2015/0156035 A1 | 6/2015 | Foo et al. |
| 2015/0213087 A1 | 7/2015 | Sikri |
| 2015/0215819 A1 | 7/2015 | Bosch et al. |
| 2015/0222640 A1 | 8/2015 | Kumar et al. |
| 2015/0280959 A1 | 10/2015 | Vincent |
| 2015/0281089 A1 | 10/2015 | Marchetti |
| 2015/0281098 A1 | 10/2015 | Pettit et al. |
| 2015/0281125 A1 | 10/2015 | Koponen et al. |
| 2015/0288679 A1 | 10/2015 | Ben-Nun et al. |
| 2015/0372911 A1 | 12/2015 | Yabusaki et al. |
| 2015/0381494 A1 | 12/2015 | Cherian et al. |
| 2015/0381495 A1 | 12/2015 | Cherian et al. |
| 2016/0028640 A1 | 1/2016 | Zhang et al. |
| 2016/0043901 A1 | 2/2016 | Sankar et al. |
| 2016/0057050 A1 | 2/2016 | Ostrom et al. |
| 2016/0087888 A1 | 3/2016 | Jain et al. |
| 2016/0094384 A1 | 3/2016 | Jain et al. |
| 2016/0094389 A1 | 3/2016 | Jain et al. |
| 2016/0094451 A1 | 3/2016 | Jain et al. |
| 2016/0094452 A1 | 3/2016 | Jain et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094457 A1 | 3/2016 | Jain et al. |
| 2016/0094631 A1 | 3/2016 | Jain et al. |
| 2016/0094632 A1 | 3/2016 | Jain et al. |
| 2016/0094633 A1 | 3/2016 | Jain et al. |
| 2016/0094642 A1 | 3/2016 | Jain et al. |
| 2016/0094643 A1 | 3/2016 | Jain et al. |
| 2016/0094661 A1 | 3/2016 | Jain et al. |
| 2016/0149816 A1 | 5/2016 | Roach et al. |
| 2016/0164787 A1 | 6/2016 | Roach et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0294933 A1 | 10/2016 | Hong et al. |
| 2016/0352866 A1 | 12/2016 | Gupta et al. |
| 2017/0005920 A1 | 1/2017 | Previdi et al. |
| 2017/0063928 A1 | 3/2017 | Jain et al. |
| 2017/0142012 A1 | 5/2017 | Thakkar et al. |
| 2017/0149582 A1 | 5/2017 | Cohn et al. |
| 2017/0230467 A1 | 8/2017 | Salgueiro et al. |
| 2017/0310588 A1 | 10/2017 | Zuo |
| 2017/0364794 A1 | 12/2017 | Mahkonen et al. |
| 2017/0373990 A1 | 12/2017 | Jeuk et al. |
| 2018/0091420 A1 | 3/2018 | Drake et al. |
| 2018/0124061 A1 | 5/2018 | Raman et al. |
| 2018/0159733 A1 | 6/2018 | Poon et al. |
| 2018/0159943 A1 | 6/2018 | Poon et al. |
| 2018/0234360 A1 | 8/2018 | Narayana et al. |
| 2018/0248986 A1 | 8/2018 | Dalal |

(56) References Cited

U.S. PATENT DOCUMENTS

| | | | |
|---|---|---|---|
| 2018/0262427 | A1 | 9/2018 | Jain et al. |
| 2018/0262434 | A1 | 9/2018 | Koponen et al. |
| 2019/0020600 | A1 | 1/2019 | Zhang et al. |
| 2019/0068500 | A1 | 2/2019 | Hira |
| 2019/0132220 | A1 | 5/2019 | Boutros et al. |
| 2019/0132221 | A1 | 5/2019 | Boutros et al. |
| 2019/0149512 | A1 | 5/2019 | Sevinc et al. |
| 2019/0238363 | A1 | 8/2019 | Boutros et al. |
| 2019/0238364 | A1 | 8/2019 | Boutros et al. |

FOREIGN PATENT DOCUMENTS

| | | | |
|---|---|---|---|
| EP | 2426956 | A1 | 3/2012 |
| EP | 3201761 | A1 | 8/2017 |
| EP | 3202109 | A1 | 8/2017 |
| JP | 2005311863 | A | 11/2005 |
| WO | 9918534 | A2 | 4/1999 |
| WO | 2008095010 | A1 | 8/2008 |
| WO | 2014182529 | A1 | 11/2014 |
| WO | 2016053373 | A1 | 4/2016 |
| WO | 2016054272 | A1 | 4/2016 |
| WO | 2019084066 | A1 | 5/2019 |
| WO | 2019147316 | A1 | 8/2019 |

OTHER PUBLICATIONS

Author Unknown, "AppLogic Features," Jul. 2007, 2 pages, 3TERA, Inc., available at http://web.archive.org/web20070630051607/www.3tera.com/applogic-features.html.

Dixon, Colin, et al., "An End to the Middle," Proceedings of the 12th conference on Hot topics in operating systems USENIX Association, May 2009, 5 pages, Berkeley, CA, USA.

Dumitriu, Dan Mihai, et al. (U.S. Appl. No. 61/514,990), filed Aug. 4, 2011.

Greenberg, Albert, et al., "VL2: A Scalable and Flexible Data Center Network," SIGCOMM'09, Aug. 17-21, 2009, 12 pages, ACM, Barcelona, Spain.

Guichard, J., et al., "Network Service Chaining Problem Statement draft-quinn-nsc-problem-statement-00.txt," Network Working Group, Jun. 13, 2013, 14 pages, Cisco Systems, Inc.

Joseph, Dilip Antony, et al., "A Policy-aware Switching Layer for Data Centers," Jun. 24, 2008, 26 pages, Electrical Engineering and Computer Sciences, University of California, Berkeley, CA, USA.

Sekar, Vyas, et al., "Design and Implementation of a Consolidated Middlebox Architecture," 9th USENIX conference on Networked System Design and Implementation, Apr. 25-27, 2012, 14 pages.

Sherry, Justine, et al., "Making Middleboxes Someone Else's Problem: Network Processing as a Cloud Service," SIGCOMM, Aug. 13-17, 2012, 12 pages, ACM, Helsinki, Finland.

Author Unknown, "Datagram," Jun. 22, 2012, 2 pages, retrieved from https://web.archive.org/web/20120622031055/https://en.wikipedia.org/wiki/datagram.

Halpern, J., et al., "Service Function Chaining (SFC) Architecture," draft-ietf-sfc-architecture-02, Sep. 20, 2014, 26 pages, IETF.

Kumar, S., et al., "Service Function Chaining Use Cases in Data Centers," draft-ietf-sfc-dc-use-cases-01, Jul. 21, 2014, 23 pages, IETF.

Liu, W., et al., "Service Function Chaining (SFC) Use Cases," draft-liu-sfc-use-cases-02, Feb. 13, 2014, 17 pages, IETF.

Salsano, Stefano, et al., "Generalized Virtual Networking: An Enabler for Service Centric Networking and Network Function Virtualization," 2014 16th International Telecommunications Network Strategy and Planning Symposium, Sep. 17-19, 2014, 7 pages, IEEE, Funchal, Portugal.

Non-Published Commonly Owned U.S. Appl. No. 16/005,628, filed Jun. 11, 2018, 44 pages, Nicira, Inc.

Non-Published Commonly Owned U.S. Appl. No. 16/005,636, filed Jun. 11, 2018, 45 pages, Nicira, Inc.

Non-Published Commonly Owned U.S. Appl. No. 16/427,294, filed May 30, 2019, 73 pages, Nicira, Inc.

* cited by examiner

METHOD, APPARATUS, AND SYSTEM FOR IMPLEMENTING A CONTENT SWITCH

BACKGROUND

Content switches are typically used to load balance data requests amount a group of servers (e.g., virtual machines) that provide similar services to Internet users. Such servers typically process different types of content. For instance, some servers may have dynamic content (such as URLs with .php, .asp, etc.), other servers have static image content (such as URLs with .jpg, .img, etc.) and yet others have static HTML content (such as URLs with .html). Content switches can also be used to redirect requests to different server pools on the basis of various request attributes, such as: Language, Cookies and Cookie value, HTTP method, and etc.

Today, most content switching architectures rely on one or more content switches that serve as a common node through which the content data requests are funneled. This architecture causes the content switches to serve as chokepoints for the data traffic. This is especially problematic as the volume of data requests is not static and is often hard to predict. Existing content server architectures also do not rapidly adjust to dynamically changing data request volumes.

BRIEF SUMMARY

Some embodiments provide a novel content switching method that distributes requests for different types of content to different sets of content servers. In some embodiments, the method deploys a content switch in the ingress data path of a first content server that is part of a first set of servers that processes requests for a first type of content. This content switch receives each content request that is directed to the first content server, and determines whether the received request is for the first content type that is processed by the first content server. If so, the content switch directs the request to the first content server.

On the other hand, if the request is for a second type of content that is processed by a second set of servers, the content switch identifies a second content server in the second set and forwards the request to the second content server. When the second set of servers includes two or more servers, the content switch in some embodiments performs a load balancing operation to distribute the load amongst the servers in the second set. For each request, the load balancing operation in some embodiments selects one server from the second server set based on a set of load balancing criteria that specifies one manner for distributing the requests among the servers of the second set, and then forwards the request to the selected server.

In some embodiments, the different sets of servers are part of one network (e.g., one datacenter or an associated set of datacenters) and are associated with one common network identifier. One example of a common network identifier is a virtual IP (Internet Protocol) address, also referred to as a VIP address. In some of these embodiments, the network has a set of network devices (e.g., load balancers) that distribute the content requests with this common network identifier amongst the different server sets, without considering the type of content associated with each request.

Therefore, to address the proper distribution of these requests, the method of some embodiments deploys an inline content switch in the ingress data path of each content server, so that the content switch (1) can ensure that its associated content server should process each request that is directed to it, and if not, (2) can direct the requests that are inappropriately directed to it to other content servers that are appropriate for the request's associated content type. To re-direct requests to another content server (i.e., to a content server that is not associated with the content switch), the content switch uses different re-directing mechanisms in different embodiments, such as MAC re-direct, tunnel-enabled re-directs, destination network address translation, etc.

To identify the type of requested content, each inline content switch in some embodiments establishes a layer 4 connection session (e.g., a TCP/IP session) with the source compute node of each request, so that the content switch (1) can receive a first set of one or more payload packets for the session, and (2) can extract the requested content type from the payload packet(s). Because from the perspective of the requesting source compute node the content switch is terminating the layer 4 connection, the content switch then needs (1) to establish a connection session (e.g., through a three-way TCP handshake procedure) with the content server to which it passes the request, and (2) to use this connection session to relay packets that it receives from the source compute node to the content server. In relaying these packets, the content switch in some embodiments might provide sequence number offset to the content server so that the content server can use the correct sequence numbers when providing a response to the source compute node.

When the content switch determines that the request is for a type of content that is processed by a content server associated with the content switch, the content switch passes this request to its associated content sever. However, before passing this request along, the content switch in some embodiments establishes a layer 4 connection session (e.g., by performing 3-way TCP handshake) with the associated content server because the content switch terminated the connection with the source compute node that sent the request. In other embodiments, the content switch does not establish a layer 4 connection session with its associated content server, because this server is configured to use the content switch to establish layer 4 connection sessions.

In some embodiments, the inline content switches implement a conceptual distributed content switch (also called a logical content switch) that ensures that requests for different types of content are appropriately directed to different sets of content servers. By having these content switches perform load balancing operations to distribute the requests that they re-direct between different servers in a server set, this logical content switch also serves as a logical load balancer that distributes the load amongst the servers within each set of servers. Like its associated logical content server, the logical load balancer is also a conceptual load balancer that is implemented by several load balancers that are distributed along the ingress data path of the content servers.

The logical content switch of some embodiments is implemented in a datacenter with multiple host computing devices (hosts) that execute severs and software forwarding elements (SFEs). In some embodiments, the servers are virtual machines (VMs) and/or containers that execute on the hosts. These servers include content servers. In some embodiments, content servers from the same set or from different sets can execute on the same host or on different hosts.

An SFE (e.g., a software switch and/or router) on a host is a module that communicatively couples the servers of the host to each other and/or to other devices (e.g., other servers) outside of the host. In some embodiments, the SFE implements the content switch operation of the server. In other embodiments, each server's content switch is a module that is inserted in the ingress path of the server before or after the SFE. For instance, in some embodiments, each server has a virtual network interface card (VNIC) that connects to a port of the SFE. In some of these embodiments, the content switch for the server is called by the server's VNIC or by the SFE port to which the server's VNIC connects. Other embodiments implement the distributed content switches differently. For instance, in some embodiments, two or more content servers on one host use one content switch that is inserted in the servers' ingress data paths before or after an SFE in these paths.

A set of one or more controllers facilitate the operations of the distributed content switch (DCS) and/or distributed load balancing (DLB) of some embodiments. For instance, in some embodiments, the controller set provides to each inline content switch a set of rules that identify the sets of content servers, the servers in each set, and the types of content processed by each server set. In some embodiments, the controller set provides the rules and/or configuration data directly to the inline content switches, while in other embodiments it provides this information to content switch agents that execute on the hosts and these agents relay the appropriate data to the content switches.

For the load balancing operations, load balancing statistics are gathered on the hosts based on the data messages that are directed to the content servers. The collected statistics are then passed to the controller set, which aggregates the statistics. In some embodiments, the controller set then distributes the aggregated statistics to the hosts (e.g., to agents, load balancers, or content switches on the hosts), where the aggregated statistics are analyzed to generate and/or to adjust load balancing criteria that are enforce. In other embodiments, the controller set analyzes the aggregated statistics to generate and/or to adjust load balancing criteria, which the controller set then distributes to the hosts for the load balancers to enforce. In still other embodiments, the controller set generates and distributes some load balancing criteria based on the aggregated statistics, while other load balancing criteria are adjusted on the hosts based on distributed aggregated statistics.

Irrespective of the implementation for generating the load balancing criteria, the collection and aggregation of the data traffic statistics allows the load balancing criteria to be dynamically adjusted. For instance, when the statistics show that one content server is too congested with data traffic, the load balancing criteria can be adjusted dynamically to reduce the load on this content server while increasing the load on one or more content server in the same set. In some embodiments, the collection and aggregation of the data traffic statistics also allows the method to reduce the load in any load balanced content server set by dynamically instantiating or allocating new content servers for the server set. Analogously, when the load on a content server set reduces (e.g., falls below a certain threshold), the method can remove or de-allocate content servers from the server set.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel content switching method that distributes requests for different types of content to different sets of content servers. In some embodiments, the method deploys a content switch in the ingress data path of a first content server that is part of a first set of servers that processes requests for a first type of content. This content switch receives each content request that is directed to the first content server, and determines whether the received request is for the first content type that is processed by the first content server. If so, the content switch directs the request to the first content server.

On the other hand, if the request is for a second type of content that is processed by a second set of servers, the content switch identifies a second content server in the second set and forwards the request to the second content server. When the second set of servers includes two or more servers, the content switch in some embodiments performs a load balancing operation to distribute the load amongst the servers in the second set. For each request, the load balancing operation in some embodiments (1) selects one server from the second server set based on a set of load balancing criteria that specifies one manner for distributing the requests among the servers of the second set, and then (2) forwards the request to the selected server.

Two sets of content servers can differ in a variety of ways. For instance, in some embodiments, different sets of content servers are differentiated based on the type of content that they process, e.g., a first content server set that processes requests for image files, a second content server set that processes requests for video files, and a third content server set that processes requests for HTML files. Different content server sets can also be different based on the type of operation they perform. For example, in some embodiments, a first set of content servers perform database (e.g., SQL) read operations, while a second set of content servers perform database (e.g., SQL) write operations. More generally, content request can be grouped based on any number of request attributes (such as language, cookies, cookie values, HTTP method, etc.), and different content server sets can be defined to process different groups of requests.

Figure 1:
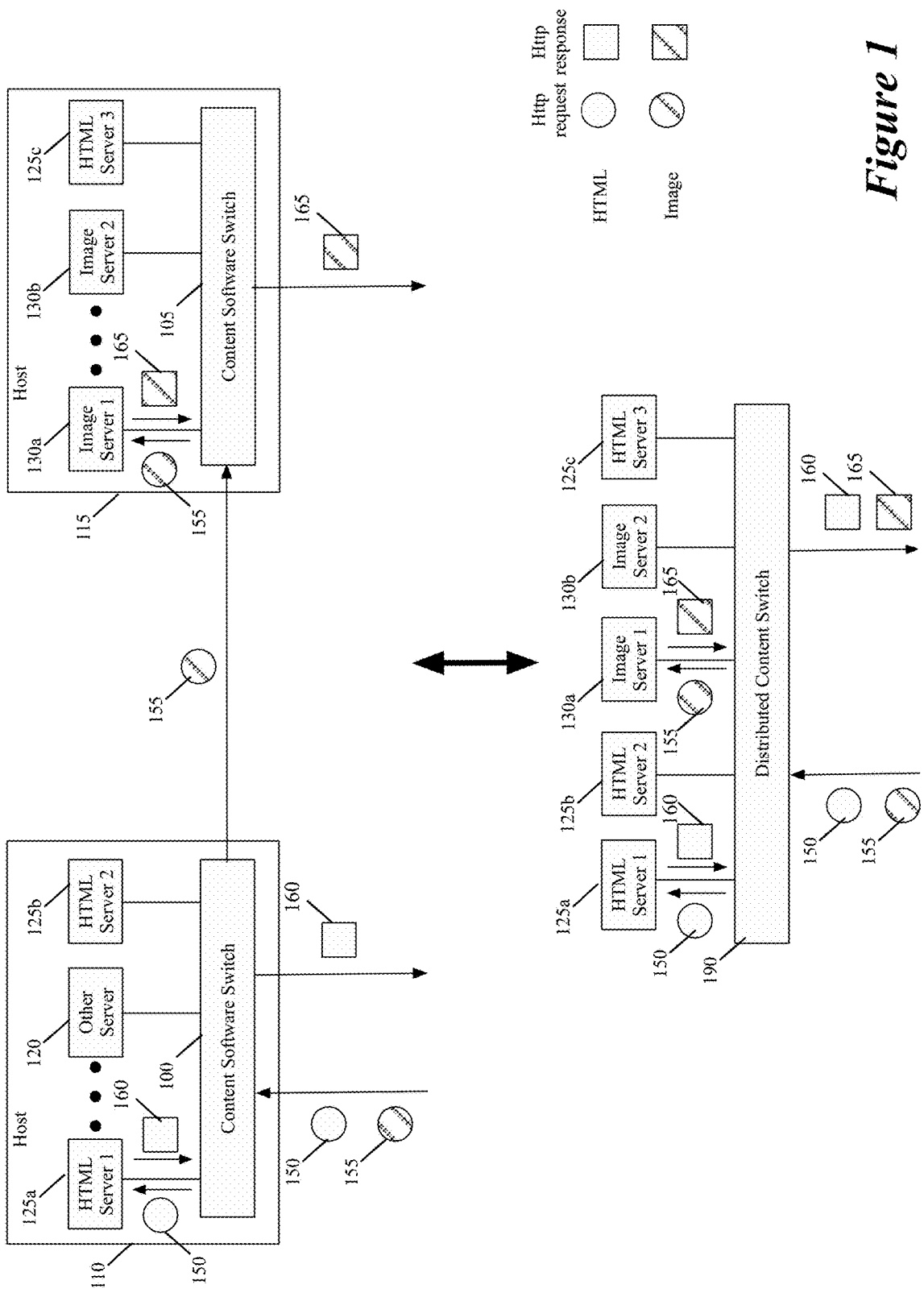
FIG. 1 illustrates a distributed content switch that implements the content switching method of some embodiments.

FIG. 1 illustrates a content switch 100 that implements the content switching method of some embodiments. Specifically, this figure illustrates two content switches 100 and 105 that are two software modules that execute on two host computing devices 110 and 115 along with several servers. The servers include non-content servers 120 and content servers, which in this example include a set of HTML servers 125 and a set of image servers 130. In some embodiments, the servers are virtual machines (VMs) that execute on the hosts, while in other embodiments, the servers are containers that execute on the hosts. As shown, content servers from different sets (e.g., HTML server set) can execute on the same host or on different hosts. Similarly, content servers from the same set can execute on the same host or on different hosts.

In some embodiments, the content servers (i.e., the HTML servers 125 and image servers 130) are collectively addressed by a common network identifier in the content requesting data messages. For instance, in some embodiments, each content requesting data message collectively addresses all of the content servers by using one virtual IP address that is associated with all of the content servers. As used in this document, a data message refers to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to second, third, and fourth layers (or L2, L3, and L4) layers are references respectively to the second data link layer, the third network layer, and the fourth transport layer of the OSI (Open System Interconnection) layer model.

In FIG. 1, each content switch 100 or 105 on each host 110 or 115 performs its content switching operation for all of the content servers on its host. As further described below, other embodiments deploy a unique content switch for each content server. In the example illustrated in FIG. 1, the content switch 100 of host 110 receives two content requests 150 and 155 at two different instances in time. The content request 150 is a request for HTML content, while the content request 155 is a request for image content. Both of these requests are part of data messages that identify all the content servers collectively, e.g., by using the content server VIP address as the destination IP address in the data packet headers. FIG. 1 uses different types of legends to illustrate the two different types of requests and the responses to these requests. Specifically, it shows white circles and squares to pictorially represent the HTML requests and HTML responses respectively, while using cross-hatched circles and squares to pictorially represent the image requests and image responses respectively.

As shown in FIG. 1, the content switch 100 forward the HTML request 150 to one of the HTML servers 125a on its host, because after examining this request, it determines that the request is for content that one of its content servers processes. As further described below, a content switch in some embodiments has to perform a "soft" termination of the connection session (i.e., has to establish a layer 4 connection session (e.g., a TCP/IP session)) with the source compute node that sent the content request, so that the content switch can receive one or more payload packets for the session, in order to extract the requested content type from the payload packet(s). As shown, after providing the HTML request 150 to the HTML server 125a, the content switch 100 receives the requested HTML content 160 from the HTML server 125a, and directs this response to the requesting device (not shown) through an intervening network fabric (not shown).

On the other hand, after receiving the image request 155, the content switch determines that this request is not for content that one of its servers processes, identifies host 115 as a host that has an image server that handles image requests, and re-directs the image request 155 to the host 115. To re-direct the image request to host 115, the content switch 100 uses different re-directing mechanisms in different embodiments, such as MAC re-direct, tunnel-enabled re-directs, destination network address translation, etc. At host 115, the content switch 105 determines that the request 155 is for content that one of its content servers processes, and forwards the image request 155 to one of its image servers 130a. In response, the image server 130a provides the requested image content 165 to the content switch 105, which then directs this response to the requesting device (not shown) through an intervening network fabric (not shown).

As further shown in FIG. 1, the content switches 100 and 105 implement a distributed content switch 190 that ensures that requests for different types of content are appropriately directed to different sets of content servers. In the discussion below, a distributed content switch is also referred to as a logical content switch as it is not a single physical switch in a physical world, but rather is a conceptual construct that describes the collective operation of multiple different physical constructs (e.g., multiple different content software switches, software filters, etc.). FIG. 1 shows the conceptual distributed content switch directing the HTML request 150 to HTML server 125a, directing the image request 155 to image server 130a, and directing the responses 160 and 165 from these servers to the requesting servers (not shown) through intervening network fabric (not shown).

Figure 2:
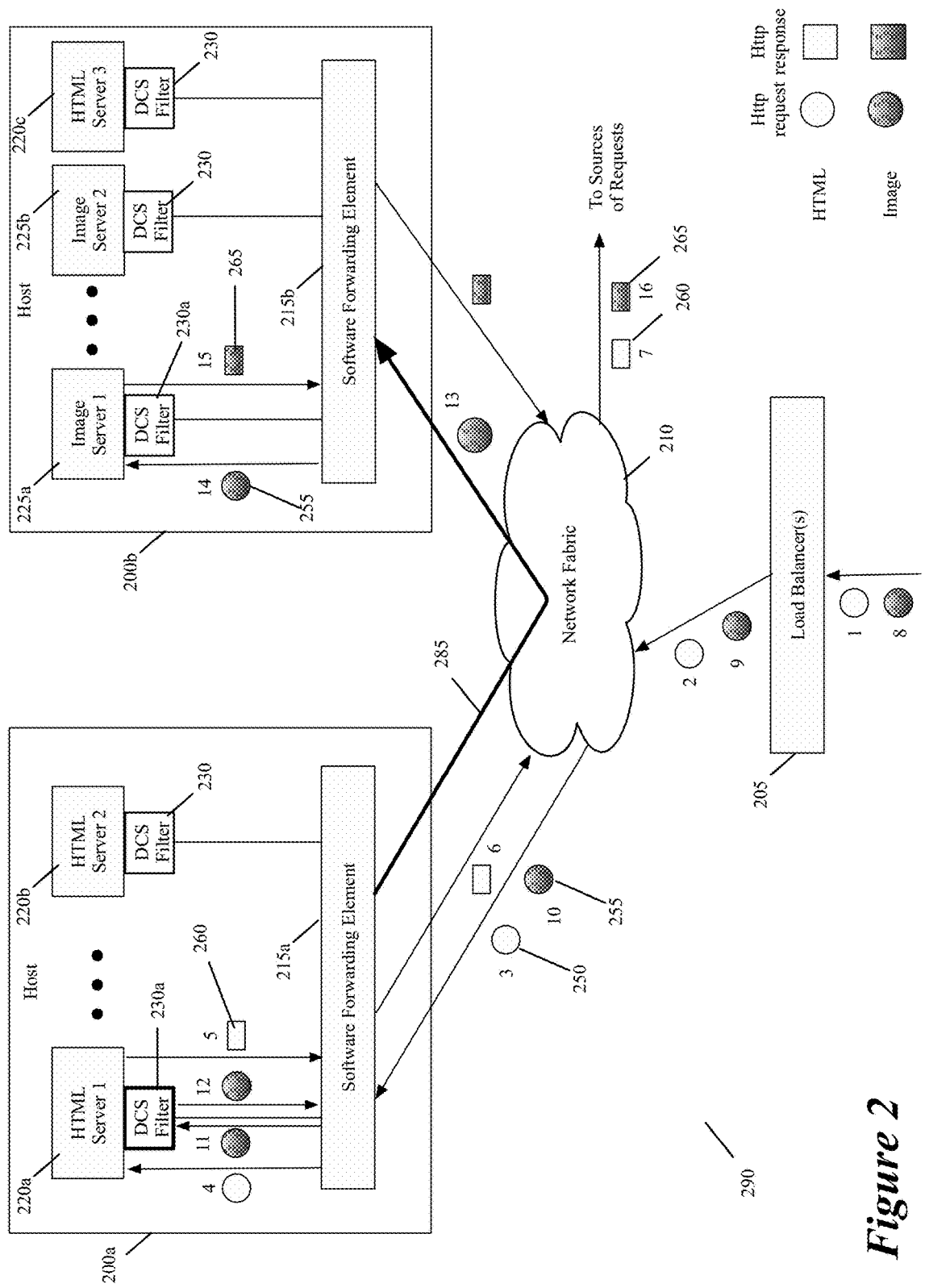
FIG. 2 illustrates another distributed content switching architecture of some embodiments of the invention.

FIG. 2 illustrates another distributed content switching architecture of some embodiments of the invention. In this architecture, the distributed content switching operation is performed by several content switching filters that execute on several hosts in a datacenter 290. As shown, the datacenter includes several host computing devices 200, a set of load balancers 205, and intervening network fabric 210 that connects the hosts 200 and the load balancer set 205. Each host computing device (host) executes a software forwarding element 215, several content servers 220 and 225, and a distributed content switch (DCS) filter 230 for each content server.

In this example, the content severs are HTML servers 220 and image servers 225. In some embodiments, the servers are virtual machines (VMs) and/or containers that execute on the hosts. As shown, content servers from different sets (e.g., HTML server set) can execute on the same host or on different hosts. Similarly, content servers from the same set can execute on the same host or on different hosts.

The content servers are connected to each other, to other resources on the hosts, and to the load balancer set 205 through software forwarding elements 215 and the intervening network fabric 210. Examples of software forwarding elements 215 include software switches and/or software routers. Intervening network fabric 210 in some embodiments includes switches, routers, and other network devices that operate outside of the hosts.

In the distributed content switching architecture of FIG. 2, one DCS filter 230 is placed between each content server (e.g., a server 220 or 225) and the SFE 215 on the server's host. In some embodiments, each content server's DCS filter is just placed in the ingress data path of the server (i.e., each DCS filter is not in the egress data path between the server and the SFE). Each content server's DCS filter examines content requests that the SFE forwards to the content server and determines whether the received request is for a content type that is processed by the filter's associated content server. If so, the DCS filter 230 directs the request to its content server. On the other hand, when the request is for a type of content that is not processed by the filter's server, the DCS filter 230 identifies another content server to process the request and forwards the request to this other server.

In some embodiments, a content request might be inappropriately sent to the wrong content server because (1) the different sets of content servers are associated with one common network identifier (such as one VIP address) and (2) the load balancer set 205 distributes the content requests with the common network identifier amongst all the content servers without identifying the type of content that is needed for processing each request. For instance, in some embodiments, the load balancer set distributes each content request (e.g., each data packet that has the content-server VIP address as its destination IP address in its packet header) based on a hash of the packet's five-tuple identifiers (i.e., a hash of the source IP address, destination IP address, source port, destination port, and protocol) without considering the type of content that is requested. Therefore, to address the proper distribution of these requests, each DCS filters of some embodiments (1) examines each request that it receives for its content server to determine whether its server should process the request, and if not, (2) directs the request that is inappropriately directed to its server to another content server that is appropriate for the request's associated content type.

In the example illustrated in FIG. 2, the load balancer set 205 sends to the HTML server 220a two content requests 250 and 255 at two different instances in time. The first content request 250 is a request for HTML content, while the second content request 255 is a request for image content. Both these requests are part of data packets addressed to the VIP address associated with all the content servers. FIG. 2 uses different types of legends to illustrate the two different types of requests and the responses to these requests. Specifically, it shows white circles and squares to pictorially represent the HTML requests and HTML responses, while using cross-hatched circles and squares to pictorially represent the image requests and image responses. Moreover, in this example, the order of the request/response message flow is identified by the sequence of numbers that is illustrated next to each version of the request or response message as it is passes between the illustrated components (e.g., between the load balancer(s), the network fabric, or software modules).

As shown in FIG. 2, the DCS filter 230a forward the HTML request 250 to its HTML server 220a, because after examining this request, it determines that the request is for content that its content server processes. As further described below, a DCS filter (like filter 230a) in some embodiments has to perform a "soft" termination of the connection session (i.e., has to establish a layer 4 connection session (e.g., a TCP/IP session)) with the source compute node of the content request, so that the DCS filter can receive one or more payload packets for the session, in order to extract the requested content type from the payload packet(s). As shown, after providing the HTML request 250 to the HTM server 220a, the HTML server 220a provides the requested HTML content 260 to the SFE 215a, which then directs this response to the requesting device (not shown) through an intervening network fabric 210.

On the other hand, upon receiving the image request 255, the DCS filter 230a determines that this request is not for content that its HTML server 220a processes, selects the image server 225a as the image server for processing this image request, identifies the host 200b as a host on which the image server 225a executes, and re-directs the image request 255 to the image server 225a by re-directing it to the SFE 215b of the host 200b. To re-direct the image request to host 200b, the DCS filter 230a uses a tunnel 285 that is established between the SFE 215a on the host 200a and the SFE 215b on the host 200b.

To use the tunnel, the DCS filter 230a in some embodiments encapsulates the packets that it receives from the requesting source compute node (SCN) with a packet header for the tunnel, and then provides the encapsulated packets to the SFE 215a to forward to the SFE 215b. Instead of directly encapsulating the re-directed packets, the DCS filter 230a in other embodiments has another filter module (e.g., another module associated with server 220a) encapsulate the re-directed packets with the packet header for the tunnel. In still other embodiments, the DCS filter 230a uses different re-directing mechanisms to re-direct the image requests to the host 200b. For instance, in other embodiments, the DCS filter 230a uses MAC re-direct (i.e., changes the destination MAC address in each packet header from the MAC address associated with HTML server 220a to the MAC address associated with image server 225a), or use DNAT re-direct (i.e., changes the destination IP address in each packet header from the IP address associated with HTML server 220a to the IP address associated with image server 225a). In yet other embodiments, the DCS filter 230a has the SFE 215a encapsulate the tunnel packet headers or perform the MAC/DNAT re-direct to relay the re-directed data packets to the host 200b.

At host 200b, the SFE 215b in some embodiments provides the image request 255 to the DCS filter 230b of the image server 225a, and this filter forwards the image request 255 to its image server 225a after determining that the request 255 is for image content that its server processes. Alternatively, in other embodiments, the SFE 215b is configured to directly provide to the image server 225a (without going through the DCS filter 230b) packets that the SFE 215b receives for the image server 225a through the tunnel 285 from the SFE 215a. In still other embodiments, the SFE 215b is configured to provide the packets that it receives through the tunnel 285 for the image server 225a to the DCS filter 230b, but the DCS filter 230b is configured to simply pass redirected image requests (e.g., as indicated by a parameter that the SFE passes to it) to the image server 225a without examining the packets to determine whether they are for image content processed by the server 225a. After receiving the image request 255, the image server 225a provides the requested image content 265 to the SFE 215b, which then directs this response 265 to the requesting device (not shown) through an intervening network fabric 210.

As mentioned above, a DCS filter in some embodiments has to establish a layer 4 connection session (e.g., a TCP/IP session) with the requesting SCN (i.e., the SCN that sent the content request), so that the DCS filter can receive one or more payload packets for the session, in order to extract the requested content type from the payload packet(s). When the DCS filter determines that it needs to direct the content request to another content server (i.e., a content server that is not associated with the DCS filter), the DCS filter in some embodiments establishes a layer 4 connection session with the other content server, and then uses this connection to relay the packets that it receives from the requesting SCN to the other content server.

Figure 3:
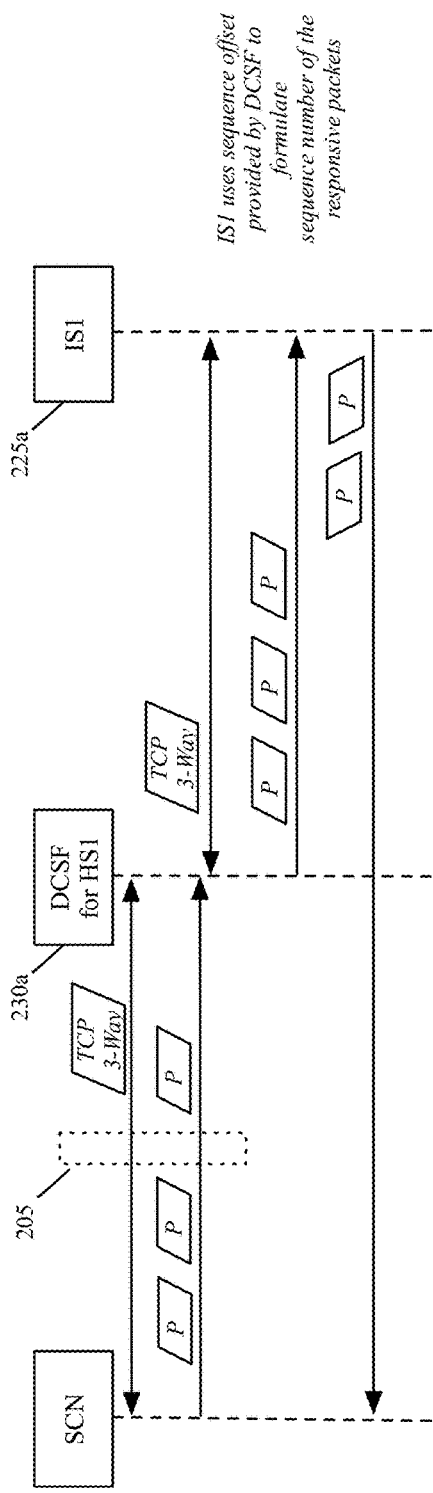
FIGS. 3 and 4 present two messaging diagrams that illustrate two different ways that a distributed content switch (DCS) filter of FIG. 2 can facilitate the relaying of the content request packets to an image server.
Figure 4:
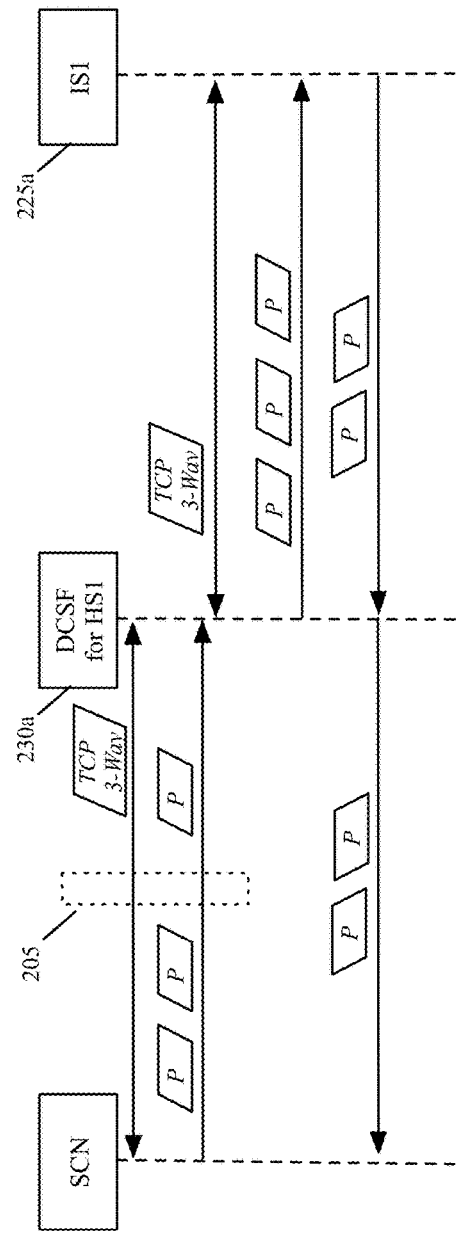

For the example illustrated in FIG. 2, FIGS. 3 and 4 present two messaging diagrams that illustrate two different ways that the DCS filter 230a can facilitate the relaying of the content request packets (i.e., the re-directed packets from the requesting SCN) to the image server 225a. As shown, in both the messaging flows, the DCS filter 230a first establishes a TCP session with the SCN by performing a 3-way TCP handshake. Both messaging flows show the front end load balancer set 205 with dotted lines in order to emphasize that this load balancer set forwards the packets from the SCN to the DCS filter 230a.

After establishing the TCP session, the DCS filter 230a identifies the type of content that is being requested from the first packet or the first few packets. In some embodiments, one manner that the DCS filter 230a uses to identify the content type is by extracting the URL (Uniform Resource Locator) and/or URL parameters that are contained in the first packet or the first few packets. The URL and/or URL parameters often contain the name or acronym of the type of content being requested (e.g., contain .mov, .img, .jpg, or other similar designations that identify the requested content).

As shown in both the messaging flows, the DCS filter 230a starts to relay the packets that it receives from the SCN to the image server 225a after identifying that the content request is for image data and determining that the image server 225a should process such a request. As further shown, the messaging flows in the examples of FIGS. 3 and 4 diverge in how they provide the response packets from the image server 225a to the SCN. In FIG. 3, these response packets are sent directly from the image server 225a to the SCN, while in FIG. 4, the response packets are first sent to the DCS filter 230a, which then relays them to the SCN.

In some embodiments, for the response packet approach of FIG. 3, the DCS filter 230a provide a TCP sequence number offset to the image server 325a, so that the image server can use this offset in adjusting its TCP sequence numbers that it uses in its reply packets that respond to packets from SCN. In some embodiments, the DCS filter 230a provides the TCP sequence number offset in the encapsulating tunnel packet header of the tunnel 285 that is used to relay packets from the DCS filter 230a to the image server 225a. In some embodiments, the DCS filter 230a also performs some TCP sequence number adjusting as it relays packets between a SCN and a content server. The DCS filter performs these adjustments because different sequence numbers might be used for the two different TCP sessions that the DCS filter has with the SCN and has with the content server.

Figure 5:
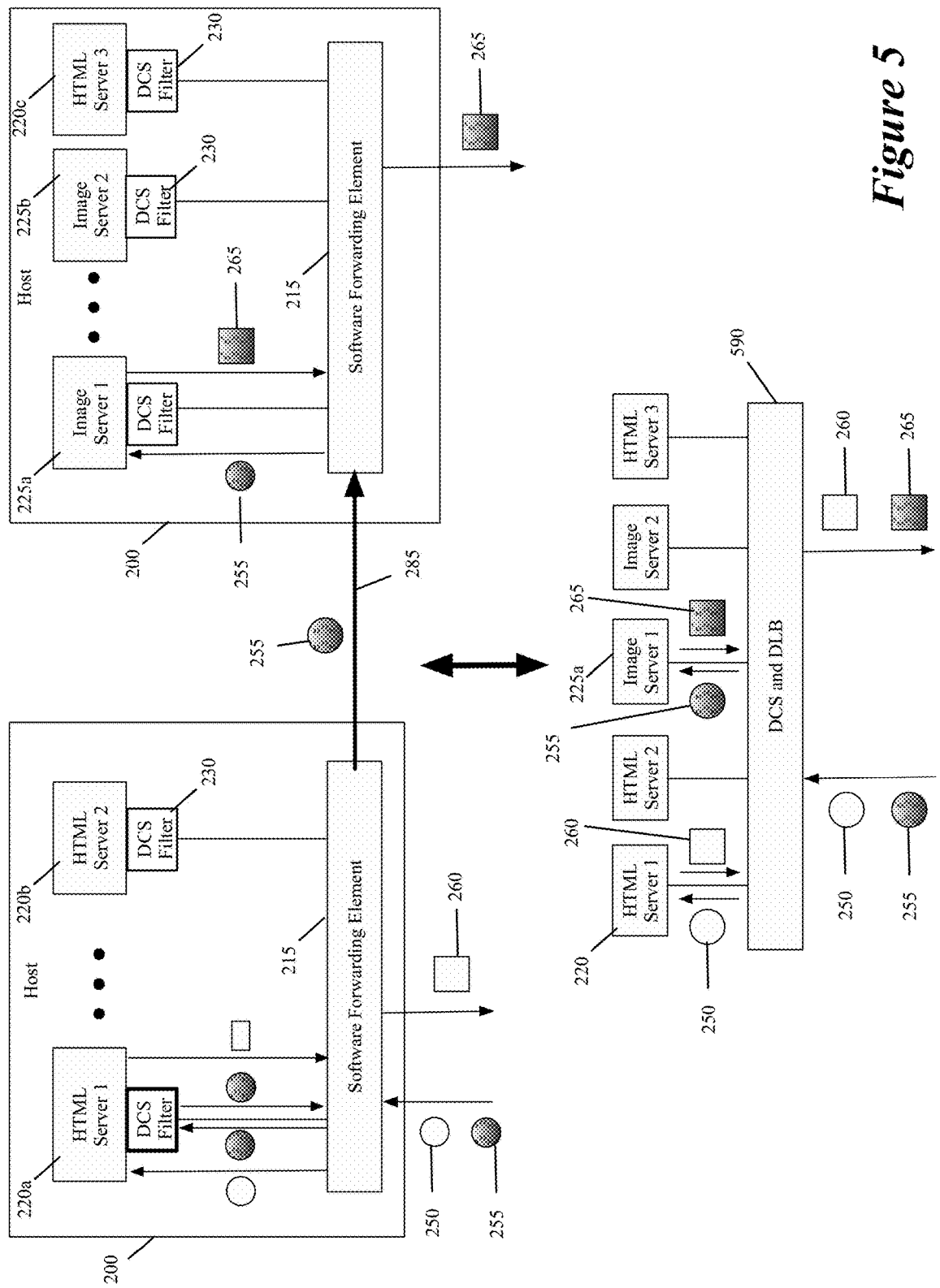
FIG. 5 illustrates that the DCS filters of the hosts implement a distributed content switch (i.e., a logical content switch) that ensures that requests for different types of content are appropriately directed to different sets of content servers.

FIG. 5 illustrates that the DCS filters 230 of the hosts 200 implement a distributed content switch 590 (i.e., a logical content switch) that ensures that requests for different types of content are appropriately directed to different sets of content servers. Specifically, this figure shows the conceptual distributed content switch 590 directing the HTML request 250 to HTML server 220a, directing the image request 255 to image server 225a, and directing the responses 260 and 265 from these servers to the requesting servers (not shown) through intervening network fabric (not shown).

In some embodiments, each DCS filter 230 not only performs a content switch operation for its content server, but also perform a load balancing operation that distributes the content request load amongst another set of servers when the filter has to re-direct the received content requests to servers in the other set. For each re-directed request, the load balancing operation of the DCS filter in some embodiments (1) selects one server from the other server set based on a set of load balancing criteria that specifies one manner for distributing the requests among the servers of the other set, and then (2) forwards the request to the selected server. For instance, to re-direct the image request 255 to one of the image servers in the image server set, the DCS filter 230a first performs a load balancing operation that identifies the imager server 225a as the image server that should receive the request 255, and then re-directs this request to the image server 225a.

By having these content switches perform load balancing operations to distribute the requests that they re-direct between different servers in a server set, the logical content switch also serves as a logical load balancer that distributes the load amongst the servers within each set of servers that receives the re-directed data messages. FIG. 5 identifies the distributed content switch 590 as also a distributed load balancer (DLB) because, in this example, the DCS filters 230 perform load balancing operations when they re-direct to other servers requests that they receive. Like a logical content server, the logical load balancer is also a conceptual load balancer that is implemented by several DCS filter load balancers that are distributed along the ingress data path of the content servers.

In contrast to traditional centralized content switching and load balancing architectures that have content switches and load balancers that are chokepoints for traffic, the distributed content switch architecture of FIGS. 2 and 5 does not have data traffic chokepoints. Also, this distributed architecture is ideally suited for the unpredictable number of requests and clients that may exist at any one time. Because of its distributed nature, this architecture is able to handle very high performance requirements (e.g., high TCP connection per second and high HTTP request per second).

One other aspect of this high-performance architecture that makes it ideally suitable for the unpredictable nature of data traffic flow is that in this architecture, the sets of content servers are dynamically adjustable based on the data traffic flow. In other words, servers can be elastically added or removed to each content server set based on the changing nature of the data traffic flow. Also, the load balancing operation of the DCS filters can be modified to change how the filters distribute load amongst the content servers in one set.

To dynamically adjust the content server sets, the network controllers of the distributed content switching architecture of some embodiments (1) gather data regarding traffic flow, (2) based on the gathered data, modify one or more sets of content servers, and/or (3) adjust dynamically the configuration of the DCS filters to modify their load balancing operations for distributing the load across one or more content server sets and/or to account for the modifications to the server sets in performing their content switching and/or load balancing operations. The elastic nature of this architecture will be further described below.

Figure 6:
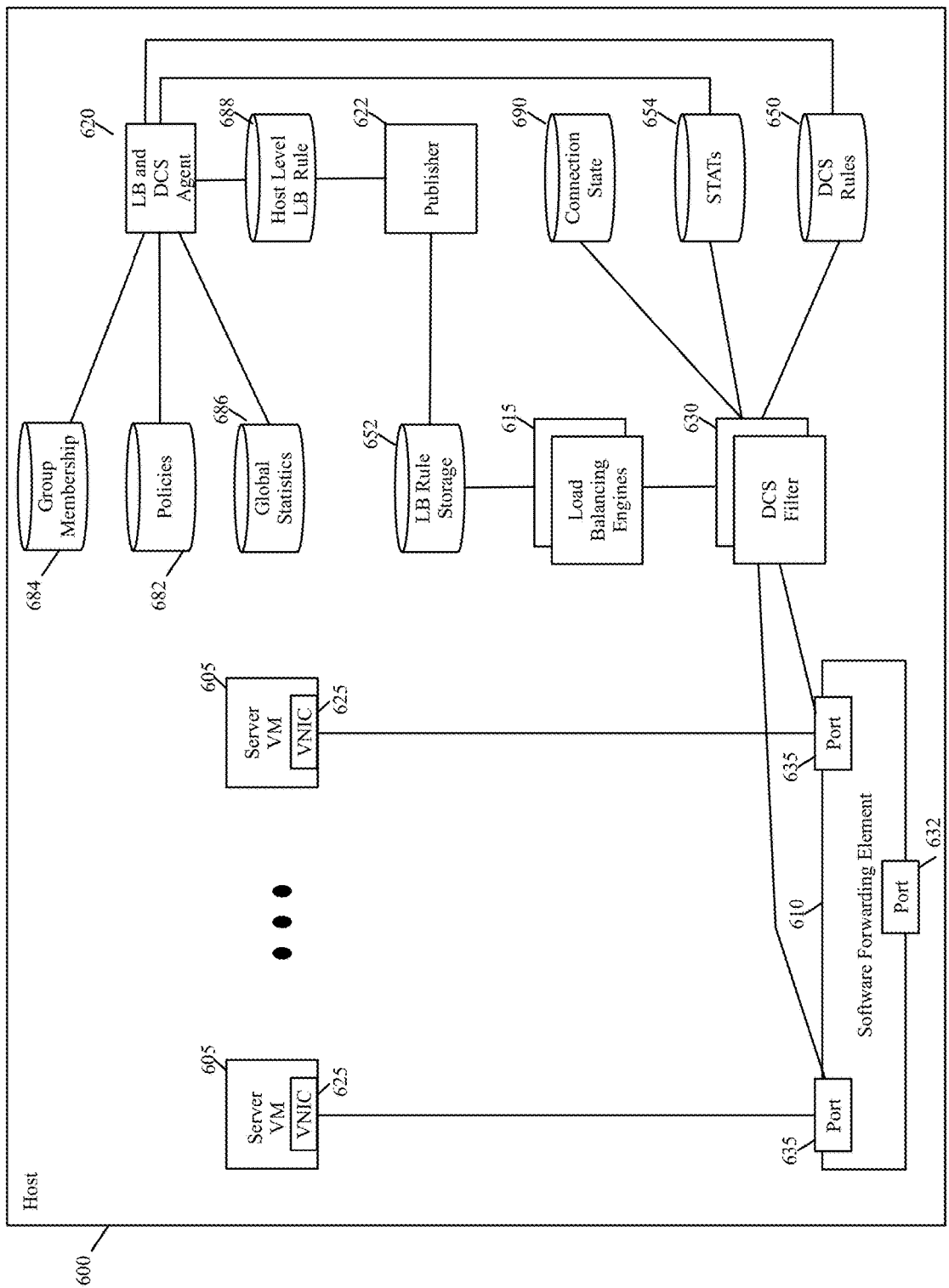
FIG. 6 illustrates a more detailed architecture of a host that executes the DCS filters of some embodiments of the invention.

FIG. 6 illustrates a more detailed architecture of a host 600 that executes the DCS filters of some embodiments of the invention. As shown, the host 600 executes multiple VMs 605, an SFE 610, multiple DCS filters 630, multiple load balancers 615, an agent 620, and a publisher 622. The host also has a DCS rule storage 650, a load balancing (LB) rule storage 652, a statistics (STAT) data storage 654, group membership data storage 684, policy data storage 682, aggregated (global) statistics data storage 686, and connection state storage 690.

In some embodiments, the VMs execute on top of a hypervisor, which is a software layer that enables the virtualization of the shared hardware resources of the host. In some of these embodiments, the hypervisors provide the DCS filters in order to support inline content switching services to its VMs.

The SFE 610 executes on the host to communicatively couple the VMs of the host to each other and to other devices outside of the host (e.g., other VMs on other hosts) through one or more forwarding elements (e.g., switches and/or routers) that operate outside of the host. As shown, the SFE 610 includes a port 632 to connect to a physical network interface card (not shown) of the host, and a port 635 that connects to each VNIC 625 of each VM. In some embodiments, the VNICs are software abstractions of the physical network interface card (PNIC) that are implemented by the virtualization software (e.g., by a hypervisor). Each VNIC is responsible for exchanging data messages between its VM and the SFE 610 through its corresponding SFE port. As shown, a VM's ingress datapath for its data messages includes (1) the SFE port 632, (2) the SFE 610, (3) the SFE port 635, and (4) the VM's VNIC 625.

Through its port 632 and a NIC driver (not shown), the SFE 610 connects to the host's PNIC to send outgoing packets and to receive incoming packets. The SFE 610 performs message-processing operations to forward messages that it receives on one of its ports to another one of its ports. For example, in some embodiments, the SFE tries to use header values in the VM data message to match the message to flow based rules, and upon finding a match, to perform the action specified by the matching rule (e.g., to hand the packet to one of its ports 632 or 635, which directs the packet to be supplied to a destination VM or to the PNIC). In some embodiments, the SFE extracts from a data message a virtual network identifier (VNI) and a MAC address. The SFE in these embodiments uses the extracted VNI to identify a logical port group, and then uses the MAC address to identify a port within the port group. In some embodiments, the SFE 610 is a software switch, while in other embodiments it is a software router or a combined software switch/router.

The SFE 610 in some embodiments implements one or more logical forwarding elements (e.g., logical switches or logical routers) with SFEs executing on other hosts in a multi-host environment. A logical forwarding element in some embodiments can span multiple hosts to connect VMs that execute on different hosts but belong to one logical network. In other words, different logical forwarding elements can be defined to specify different logical networks for different users, and each logical forwarding element can be defined by multiple SFEs on multiple hosts. Each logical forwarding element isolates the traffic of the VMs of one logical network from the VMs of another logical network that is serviced by another logical forwarding element. A logical forwarding element can connect VMs executing on the same host and/or different hosts.

The SFE ports 635 in some embodiments include one or more function calls to one or more modules that implement special input/output (I/O) operations on incoming and outgoing packets that are received at the ports. One of these function calls for a port is to a DCS filter 630. In some embodiments, the DCS filter performs the content switch operations on incoming data messages that are addressed to the filter's VM. In some embodiments, one or more load balancers 205 (e.g., one or more load balancing appliances) in the datacenter 200 distribute content requests that are addressed to the VIP address of all content servers among the content serving VMs without regard to the content request type and the type of contents that the content serving VMs process. In some embodiments, the load balancer 205 directs a content request packet to one of the content serving VM by changing the destination MAC address of packet to the MAC address of the VM. In other embodiments, the load balancer 205 directs a content request packet to one of the content serving VM by changing the destination IP address of packet to the IP address of the VM.

In the embodiments illustrated in FIG. 6, each port 635 has its own DCS filter 630. In other embodiments, some or all of the ports 635 share the same DCS filter 630 (e.g., all the ports on the same host share one DCS filter, or all ports on a host that are part of the same logical network share one DCS filter).

Examples of other I/O operations that are implemented through function calls by the ports 635 include firewall operations, encryption operations, message encapsulation operations (e.g., encapsulation operations needed for sending messages along tunnels to implement overlay logical network operations), etc. By implementing a stack of such function calls, the ports can implement a chain of I/O operations on incoming and/or outgoing messages in some embodiments. Instead of calling the I/O operators (including the DCS filter 630) from the ports 635, other embodiments call these operators from the VM's VNIC or from the port 632 of the SFE.

The DCS filters 630 perform their content switching operations based on the DCS rules that are specified in the DCS rule storage 650. For different types of content requests, the DCS rule storage 650 stores the identity of different content server (CS) sets. For each new content request flow, a DCS filter 630 identifies the requested content type. When its VM processes the identified requested content type, the DCS filter passes the content request to its VM. On the other hand, when the identified requested content type is not one that its VM processes, the DCS filter re-directs this request to another VM.

To perform this re-direction, the DCS filter 630 examines its DCS rule storage 650 to identify the CS set that processes the identified, requested content type. Also, for this re-direction, the DCS filter 630 in some embodiments performs a load balancing operation to distribute the re-directed content request that it sends to the identified CS set among the servers in the set. To perform its load balancing operation for the servers of the identified CS sets, each DCS filter 630 has a load balancer 615 that the filter uses to identify one content server in the identified CS set for each new content request packet flow that the DCS filter has to re-direct. In other embodiments, all the DCS filters use the same load balancer 615, or multiple DCS filters use one load balancer 615 (e.g., DCS filters of VMs that are part of one logical network use one load balancer 615 on each host).

A load balancer 615 selects one content server from an identified CS set (i.e., a CS set identified by a DCS filter) based on the LB rules that are specified in the LB rule storage 652. For one load balanced CS set, the LB rule storage 652 stores a load balancing rule that specifies one or more physical addresses (e.g., IP addresses) of content server(s) of the set to which a data message can be re-directed. More specifically, in some embodiments, the LB rule storage 652 stores multiple LB rules, with each LB rule associated with one load balanced CS set. In some embodiments, each LB rule includes (1) the identifier of a CS set, (2) an address for each server in the CS set.

In some embodiments, the server addresses in a LB rule are the IP addresses of these servers. In some embodiments, the content server addresses are supplied as a part of the data initially supplied by a controller set (e.g., in order to configure the load balancer) or are supplied in subsequent updates to the CS set information that is provided by the controller set. Also, in some embodiments, for each identified content server, the LB rule specifies the tunnel to use to send a re-directed packet to the content server. In some embodiments, an LB rule can specify different re-direction mechanisms for accessing different content servers, as not all content servers are accessible through the same re-direction mechanism.

After the DCS filter identifies the CS set that should process a content request that it needs to re-direct, the filter in some embodiments provides the CS set identifier to the load balancer, so that the load balancer can use this identifier to identify the LB rule that it needs to use to select a content server in the CS set. In some embodiments, each LB rule stores the load balancing criteria that the load balancer 615 has to use to select one of the content servers of the CS set.

For instance, in some embodiments, the load balancers 615 use a weighted round robin scheme to select the content servers. Accordingly, in some of these embodiments, each LB rule stores a weight value for each content server specified in the LB rule, and the weight values provides the criteria for the load balancer to spread the traffic to the content servers of the CS set associated with the rule. For example, assume that the CS set has five servers and the weight values for these servers are 1, 3, 1, 3, and 2. Based on these values, a load balancer would distribute content requests that are part of ten new content request flows as follows: 1 to the first content server, 3 to the second content server, 1 to the third content server, 3 to the fourth content server, and 2 to the fifth content server. In some embodiments, the weight values for an LB rule are generated and adjusted by the agent 620 and/or a controller set based on the statistics that DCS filters store in the STAT data storage 654, as further described below.

To gracefully switch between different load balancing criteria, an LB rule in some embodiments can specify time periods for different load balancing criteria of the LB rule that are valid for different periods of time. Specifically, in some embodiments, each LB rule can have multiple sets of IP addresses and multiple sets of weight values. Each set of IP addresses and its associated set of weight values represents one set of load balancing criteria. For each of these sets of load balancing criteria, each rule has a time value that specifies the time period during which the IP address set and its associated weight value set are valid.

For instance, in an LB rule, the time value for one IP address set might specify "before 1 pm on Sep. 1, 2015," while the time value for another IP address set might specify "after 12:59 pm on Sep. 1, 2015." These two time periods allow the load balancers to seamlessly switch from using one IP address set and its associated weight value set to another IP address set and its associated weight value set at 1 pm on Sep. 1, 2015. These two IP address sets might be identical and they might only differ in their associated weight value sets. Alternatively, the two IP address sets might be different. Two IP address sets might differ but have overlapping IP addresses (e.g., one set might have five IP addresses, while another set might have four of these five IP addresses when one content server is removed from a CS set). Alternatively, two IP address sets might differ by having no IP addresses in common.

As shown in FIG. 6, the host also includes a connection state storage 690 in which a DCS filter stores data records that allow the DCS filter to maintain connection state for data messages that are part of the same flow, and thereby to distribute data messages that are part of the same flow statefully to the same content server. More specifically, whenever the DCS filter 630 passes a content request to its associated VM, the DCS filter stores a record with the identifier of its associate VM in the connection state storage 690 so that it can identify its associated VM for subsequent data messages that are part of the same flow. Also, whenever the DCS filter 630 uses a load balancer to identify another content serving VM to receive a re-directed content request, DCS filter not only sends the re-directed content request to the identified content serving VM, but also stores a record in the connection state storage 690 to identify (e.g., in terms of the other content serving VM's IP address) the other content serving VM for subsequent data messages that are part of the same flow.

Each flow's record in the connection state storage 690 not only stores the identity of the content server (e.g., the identifier of filter's own VM or the destination IP address of another content server) but also stores the flow's header values (e.g., the five tuple values). In some embodiments, for fast access, the connection data storage 690 is hash indexed based on the hash of the header values of the flows for which the storage 690 has records.

To identify a content server for a received data message, the DCS filter first checks the connection state storage 690 to determine whether it has previously identified a content server for receiving data messages that are in the same flow as the received message. If so, the DCS filter uses the content server that is identified in the connection state storage. Only when the DCS filter does not find a connection record in the connection state storage 690, the DCS filter in some embodiments examines the packet payload to identify the type of content being requested, and then if needed examines the DCS rules and in some cases the LB rules (in the DCS and LB rule storages 650 and 652) in order to identify a content server to receive the data message.

By searching the connection state storage 690 with the message identifiers of subsequent data messages that are part of the same flow, the DCS filter can identify the content server that it previously identified for a data message of the same flow, in order to use the same content server for the messages that are part of the same flow (i.e., in order to statefully perform its content switching operation). In some embodiments, the DCS filter also uses the connection state storage 690 records to replace the content server's destination address with the virtual group address (e.g., the group VIP address) on the reverse flow path when the DCS filter receives (from the SFE port 630 or 635) data messages sent by the content server to the source compute node that requested the content. After translating of the destination addresses of a data message in the reverse flow, the DCS filter returns the data message to the SFE port that called it, so that the SFE port can direct the data message to source compute node.

In FIG. 6, only one LB rule data storage 652 and only one connection state storage 690 are illustrated for all load balancers 615 and the DCS filters 630. In other embodiments, each DCS filter has its own connection state storage 690 and each load balancer has its own LB rule storage 652. When each load balancer 615 has its own rule data storage 652 and each DCS filter has its own connection state storage 690, these storages can be smaller and easier to search more quickly. In yet other embodiments, the host has several rule data storages 652 or connection state storages 690, but two or more load balancers or DCS filters share a rule data storage or connection state storage (e.g., two load balancers or DCS filters that are balancing the load for two VMs that are part of the same logical network).

In some embodiments, each time a DCS filter performs a content switching operation on a data message (i.e., directs a message to a content serving VM), the DCS filter updates the statistics that it maintains in the STAT data storage 654 for the data traffic that it relays to the content servers. Examples of such statistics include the number of data messages (e.g., number of packets), data message flows and/or data message bytes relayed to each content server. In some embodiments, the metrics can be normalized to units of time, e.g., per second, per minute, etc.

In some embodiments, the agent 620 gathers (e.g., periodically collects) the statistics that the DCS filters store in the STAT data storage(s) 654, and relays these statistics to a controller set. Based on statistics that the controller set gathers from various agents 620 of various hosts, the controller set (1) distributes the aggregated statistics to each host's agent 620 so that each agent can define and/or adjust the load balancing criteria of the load balancers on its host, and/or (2) analyzes the aggregated statistics to specify and distribute some or all of the load balancing criteria for the load balancers to enforce. In some embodiments where the controller set generates the load balancing criteria from the aggregated statistics, the controller set distributes the generated load balancing criteria to the agents 620 of the hosts.

In the embodiments where the agent 620 receives new load balancing criteria from the controller set, the agent 620 stores these criteria in the host-level LB rule storage 688 for propagation to the LB rule storage(s) 652. In the embodiment where the agent 620 receives aggregated statistics from the controller set, the agent 620 stores the aggregated statistics in the global statistics data storage 686. In some embodiments, the agent 620 analyzes the aggregated statistics in this storage 686 to define and/or adjust the load balancing criteria (e.g., weight values), which it then stores in the LB rule storage 688 for propagation to the LB rule storage(s) 652. The publisher 622 retrieves each LB rule and/or updated load balancing criteria that the agent 620 stores in the LB rule storage 688, and stores the retrieved rule or criteria in the LB rule storage 652 of the load balancer 615 that needs to enforce this rule.

The agent 620 not only propagates LB rule updates based on newly received aggregated statistics, but it also propagates LB rules or updates LB rules based on updates to CS sets that it receives from the controller set. The agent 620 stores each CS set's members that it receives from the controller set in the group data storage 684. When a content server is added or removed from a CS set, the agent 620 stores this update in the group storage 684, and then formulates updates to the LB rules to add or remove the destination address of this content server to or from the LB rules that should include or already include this address. Again, the agent 620 stores such updated rules in the rule data storage 688, from where the publisher propagates them to the LB rule storage(s) 652 of the load balancers that need to enforce these rules.

When a content server is added to a CS set, the updated LB rules cause the load balancers to direct some of the CS set's data messages to the added content server. Alternatively, when a content is removed from a CS set, the updated LB rules cause the load balancers to re-direct data messages that would go to the removed content server, to other content servers in the CS set. Even after a content server is intentionally designated for removal from a CS set, a DCS filter in some embodiments may continue to send data messages (e.g., for a short duration of time after the removal of the content server) to the content server that are part of prior flows that were directed to the content server. This allows the content server to be removed gradually and gracefully from the CS set as the flows that it handles terminate. Some embodiments also achieve a graceful transition away from a content server that should be removed from the CS set by using time values to specify when different LB criteria for the same LB rule should be used. Some embodiments also use such time values to gracefully add a new content server to a CS set.

In some embodiments, the agent 620 stores in the policy storage 682, LB policies that direct the operation of the agent (1) in response to newly provisioned content server VMs and their associated DCS filters and/or load balancers, and/or (2) in response to updated global statistics, LB criteria, and/or adjusted CS set membership. The policies in the policy storage 682 in some embodiments are supplied by the controller set. Also, in some embodiments, the agent 620 stores and updates content server identities and content types processed by these servers in the DCS rule storage 650.

Figure 7:
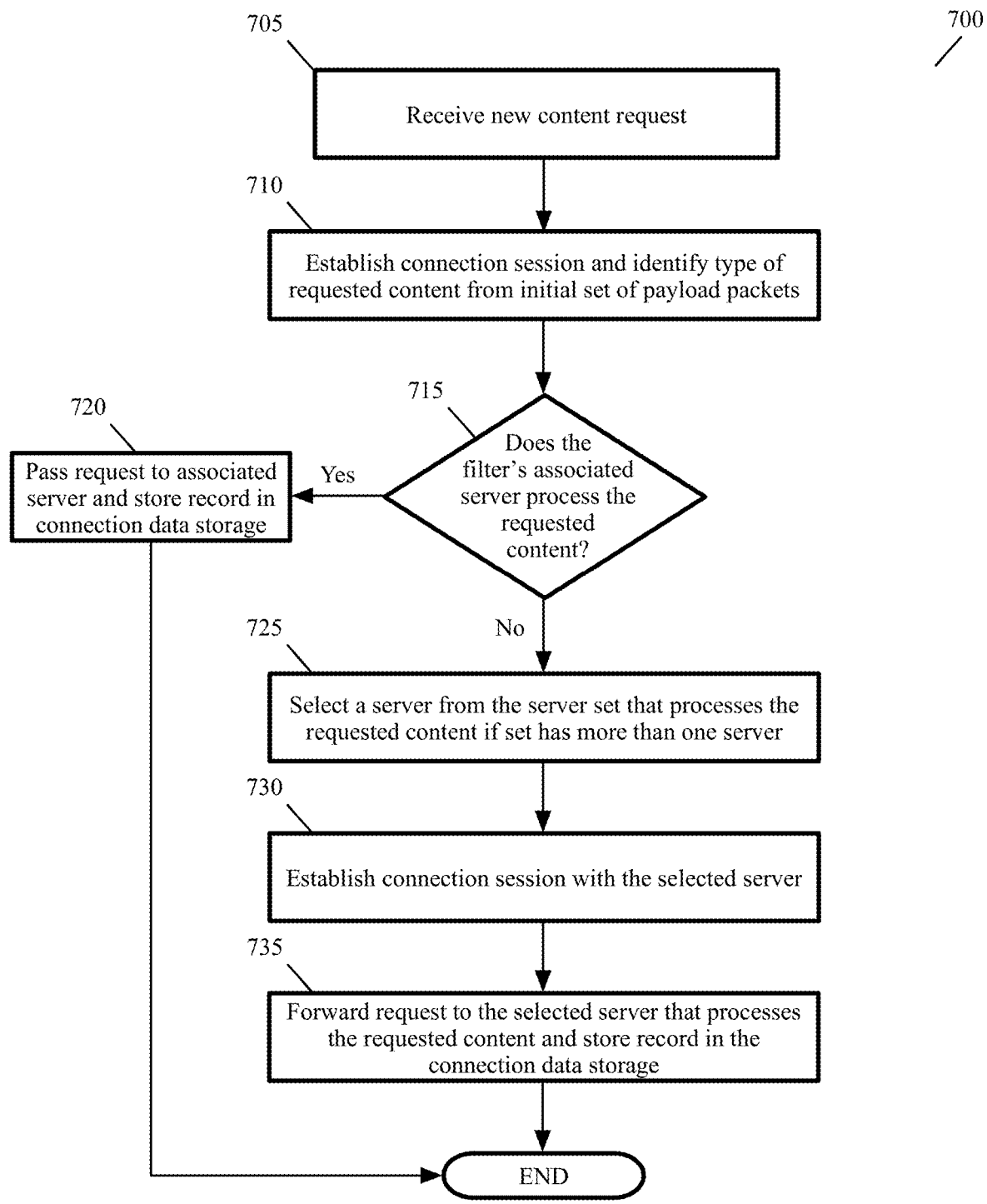
FIG. 7 conceptually illustrates a process that a DCS filter performs in some embodiment when it receives a new content request.

FIG. 7 conceptually illustrates a process 700 that a DCS filter 630 performs in some embodiment when it receives a new content request data message. As shown, the process 700 starts whenever the DCS filter receives a new content request, which is a content request for which the DCS filter's connection storage 690 does not have a record that identifies a VM to process the request. As mentioned above, one or more load balancers 205 (e.g., one or more load balancing appliances) in the datacenter 200 distribute in some embodiments the content requests that are addressed to the VIP address of all content servers among the content serving VMs without regard to the content request type and the type of contents that the content serving VMs process.

In some embodiments, a new content request starts with a request for a layer 4 connection session. After receiving the new content request, the DCS filter 630 in some embodiments establishes (at 710) a layer 4 connection session with the requesting SCN (i.e., the SCN that sent the content request), so that the DCS filter can receive one or more payload packets for the session, in order to extract the requested content type from the payload packet(s). To establish a connection session, the DCS filter 630 establishes in some embodiments a TCP session with the SCN by performing a 3-way TCP handshake.

After establishing the connection session, the DCS filter 630 identifies (at 710) the type of content that is being requested from the first payload packets or the first few payload packets. In some embodiments, one manner that the DCS filter 230a uses to identify the content type is by extracting the URL and/or URL parameters that are contained in the payload packet(s). The URL and/or URL parameters often contain the name or acronym of the type of content being requested (e.g., contain .mov, .img, .jpg, or other similar designations that identify the requested content).

After identifying the content type, the DCS filter 630 then determines (at 715) whether its associated VM (e.g., the VM that has its VNIC 625 associated with the SFE port 635 that called the DCS filter) is a content server that processes the requested content type. If so, the DCS filter 630 passes (at 720) the initial content request packet and subsequent content request packets that are part of the same flow to its associate VM and then ends. The DCS filter also stores (at 720) in its connection state storage 690 a record that it can subsequently use to identify its VM as the content server for other content request data messages that are part of the same flow.

When the DCS filter determines (at 715) that the request is for a type of content that is processed by its associated VM, the filter in some embodiments establishes (at 720) a layer 4 connection session (e.g., by performing 3-way TCP handshake) with its associated VM before passing this request along to the VM. This is because the DCS filter terminated the connection with the requesting SCN. In other embodiments, the DCS filter does not establish a layer 4 connection session with its associated VM, because this VM is configured to use the DCS filter to establish layer 4 connection sessions.

When the DCS filter 630 determines (at 715) that its associated VM is not a content server that processes the requested content type, the DCS has to re-direct the content request packet to another content server (i.e., to a content server that is not associated with the DCS filter). To re-direct the content request packet, the DCS filter first identifies (at 725) a CS set that processes the content type identified at 710. The DCS filter then directs (at 725) its load balancer to select one content server in the identified CS set. When the CS set has more than one content servers, this load balancer's selection is based on a set of load balancing criteria that specifies one manner for distributing the requests among the servers of the CS set identified at 725. On the other hand, when the CS set only has one content server, the load balancer simply selects that server. In some embodiments, the DCS filter has the addresses of the content servers and hence does not use the load balancer when the identified CS set only has one server.

After identifying a content server to which it can send the re-directed content request, the DCS filter 630 establishes (at 730) a layer 4 connection session with this content server, because the DCS filter terminated the connection session with the requesting SCN and because of this termination the content server does not have a connection session with the SCN. To establish this connection session, the DCS filter 630 in some embodiments establishes a TCP session with the content server by performing a 3-way TCP handshake.

After establishing (at 730) the connection session with the identified content server (i.e., the VM identified at 725), the DCS filter 630 uses this session (at 735) to relay the content request that it receives from the requesting SCN to the content server. As mentioned above, the DCS filter can use different re-directing mechanisms in different embodiments (such as MAC re-direct, tunnel-enabled re-directs, destination network address translation, or any combination of these) to forward the content request to the identified content server. In forwarding the content request, the content switch in some embodiments provides a TCP sequence number offset to the identified content server so that the content server can use the correct sequence numbers when providing a response to the source compute node directly. In some embodiments, the DCS filter 630 provides the sequence number offset in the encapsulating tunnel packet header of the tunnel that is used to relay packets from the DCS filter 630 to the identified content server.

When only one tunnel is established between each pair of hosts, multiple candidate content servers can be on a host. In these situations, the receiving host's SFE (i.e., the SFE of the host that receives the re-directed content request) might need to forward different content requests to different content serving VMs on its host. To address this situation, the DCS filter inserts in the tunnel packet header the IP address of the content server that should receive a re-directed content request.

At 735, the DCS filter also stores in its connection state storage 690 a record that it can subsequently use to identify the VM identified at 725 as the content server for other content requests that are part of the same flow as the request received at 705. After 735, the process ends.

Figure 8:
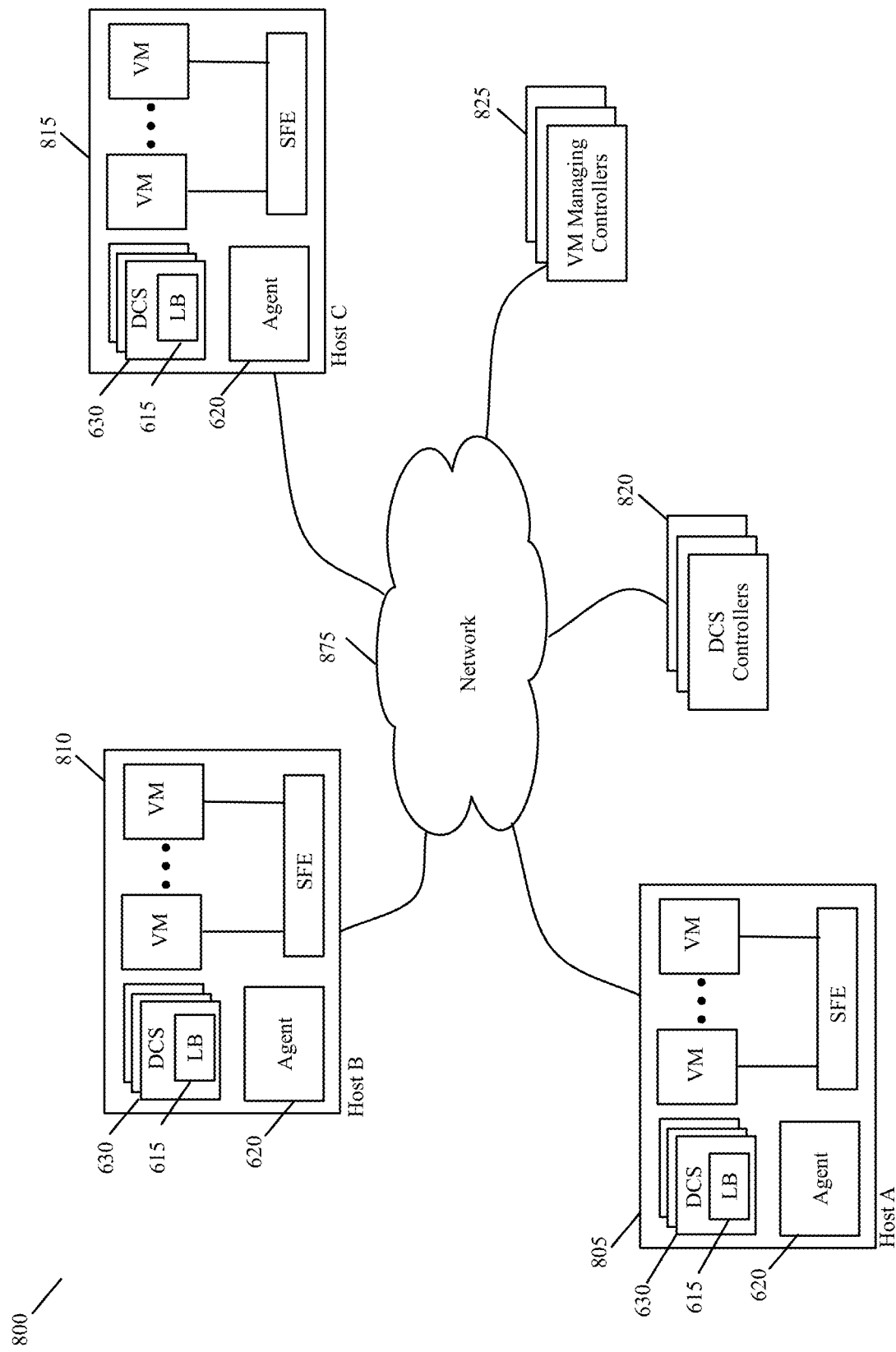
FIG. 8 illustrates an example of a DCS controller set that configures the DCS filters and their associated load balancers.

FIG. 8 illustrates an example of a DCS controller set 820 that configures the DCS filters 630 and their associated load balancers 615. The controller set 820 also gathers statistics from hosts and based on the gathered statistics, dynamically adjusts the membership of the CS sets and the operations of the load balancers. Specifically, this figure illustrates a multi-host system 800 of some embodiments.

As shown, this system includes multiple virtualized hosts 805-815, a set of DCS controllers 820, and a set of one or more VM managing controllers 825. As shown in FIG. 8, the hosts 805-815, the DCS controller set 820, and the VM manager set 825 communicatively couple through a network 875, which can include a local area network (LAN), a wide area network (WAN) and/or a network of networks (e.g., Internet). In some embodiments, the hosts 805-815 are similar to the host 600 of FIG. 6. However, in FIG. 8, not all of the software modules and storages of the hosts 805-815 are shown in order to simplify the illustration in this figure.

The VM managing controllers 825 provide control and management functionality for defining (e.g., allocating or instantiating) and managing one or more VMs on each host. These controllers in some embodiments also provide control and management functionality for defining and managing multiple logical networks that are defined on the common software forwarding elements of the hosts, while in other embodiments, this functionality is provided by the DCS controller set 820. In some embodiments, the VM managing controllers and the DCS controllers are the same set of controllers.

The DCS controller set 820 configures the DCS filters 630 (e.g., by providing identities of the CS sets, servers in these sets and the types of content processed by these sets) and their associated load balancers 615. This controller set 820 also gathers statistics from hosts and based on the gathered statistics, dynamically adjusts the membership of the CS sets and the operations of the load balancers. Specifically, as mentioned above, each host's agent 620 gathers the collected statistics from the STAT data storage 654 (not shown in FIG. 8), and relays these statistics to the DCS controller set 820. In some embodiments, the agents 620 aggregate and/or analyze some of the statistics before relaying processed statistics to the DCS controller set 820, while in other embodiments the agents relay collected raw statistics to the DCS controller set 820.

The DCS controller set 820 aggregates the statistics that it receives from the agents of the hosts. In some embodiments, the DCS controller set 820 then distributes the aggregated statistics to the agents that execute on the hosts. These agents then analyze the aggregated statistics to generate and/or to adjust LB rules or criteria that the load balancers (that execute on the same hosts as the agents) enforce.

In other embodiments, the controller set analyzes the aggregated statistics to generate and/or to adjust LB rules or criteria, which the controller set then distributes to the agents 620 of the hosts for their load balancers to enforce. In some of these embodiments, the controller set distributes the same LB rules and/or criteria to each load balancer in a group of associated load balancers (i.e., in a group of load balancers that are associated with one group of DCS filters of one CS set), while in other embodiments, the controller distributes different LB rules and/or criteria to different load balancers in the group of associated load balancers. Also, in some embodiments, the controller set distributes updated LB rules and/or criteria to some of the load balancers in an associated group of load balancers, while not distributing the updated LB rules and/or criteria to other load balancers in the associated group.

In still other embodiments, the controller set generates and distributes some load balancing rules or criteria based on the aggregated statistics, while also distributing some or all aggregated statistics to the hosts so that their agents can generate other load balancing rules or criteria. One of ordinary skill in the art will realize that in some embodiments the LB rules and/or criteria are not always adjusted based on the aggregated statistics, but rather are modified only when the aggregated statistics require such modification.

Irrespective of the implementation for generating the LB rules, the collection and aggregation of the data traffic statistics allows the LB rules or criteria to be dynamically adjusted. For instance, when the statistics show one content server as being too congested with data traffic, the LB rules or criteria can be adjusted dynamically for the load balancers of the DCS filters that send data messages to this content server, in order to reduce the load on this content server while increasing the load on one or more other content servers in the same CS set. In some embodiments, the collection and aggregation of the data traffic statistics also allows the controller set 820 to reduce the load on any content server in a load balanced CS set by dynamically directing the VM managing controller set 825 to instantiate or allocate new content serving VMs for the CS set. Analogously, when the load on a content server set reduces (e.g., falls below a certain threshold), the controller set 820 can direct the VM managing controller set 825 to remove or de-allocate content servers from the server set.

Figure 9:
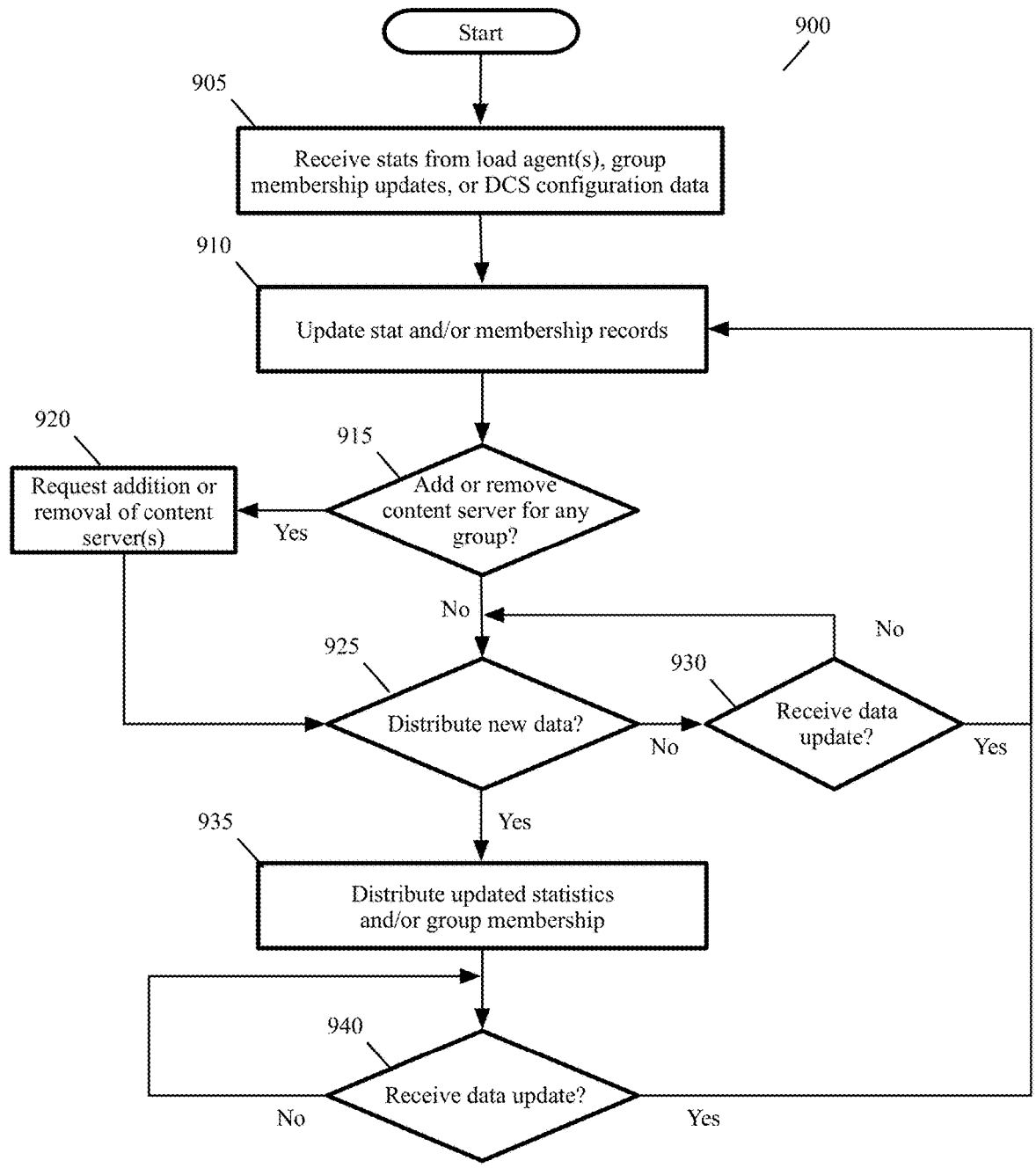
FIG. 9 illustrates a process that one or more controllers in the controller set perform in some embodiments.

FIG. 9 illustrates a process 900 that one or more controllers in the DCS controller set 820 perform in some embodiments. The controller set performs this process to distribute global statistics, group membership updates for a CS set, and/or DCS filter configuration data (e.g., CS set identifiers and associated content type for each identified CS set). As shown, the process 900 starts (at 905) when it (1) receives statistics about content server data processing load (e.g., from one or more agents 620 or load balancers 615), and/or (2) receives membership updates for a CS set (e.g., from the VM managing controller set 825). In some embodiments, the process 900 is also performed when the DCS filters of a host or series of hosts are configured initially (e.g., upon the configuration of one or more hosts, one or more content servers on one or more hosts, etc.).

The process 900 in some embodiments receives (at 905) the group membership updates from a VM managing controller 825 when it informs the process 900 that a content server has been added to a CS set when a new content server has been created for the CS set, or has been removed from the CS set when the content server has been terminated or has failed in the CS set. In some embodiments, the VM managing controller 825 instantiates a new content server or allocates a previously instantiated content server to the CS set at the direction of the process 900, as further described below.

At 910, the process updates (1) the global statistics that the controller set 820 maintains for the CS set based on the statistics received at 905, (2) the CS set's membership that the controller set maintains based on the group updates received at 905, and/or (3) the DCS filter configuration data that it maintains. Next, at 915, the process determines based on the updated statistics whether it should have one or more content server specified or removed for the group. For instance, when the updated statistics causes the aggregated statistics for the CS set to exceed a threshold load value for one or more content servers in the group, the process 900 determines that one or more new content servers have to be specified (e.g., allotted or instantiated) for the CS set to reduce the load on content servers previously specified for the group. Conversely, when the updated statistics shows that a content server in a CS set is being underutilized or is no longer being used to handle any flows, the process 900 determines (at 915) that the content server has to be removed for the CS set. In some embodiments, process 900 also determines that CS set membership should be modified when it receives such a request from a DCS filter 630 or from a host agent 620.

When the process 900 determines (at 915) that it should have one or more content servers added to or removed from a CS set, the process requests (at 920) one or more VM managers 820 to add or remove the content server(s), and then transitions to 925. As mentioned above, the VM managers in some embodiments are one or more servers that are outside of the controller set 825 that handles the DCS and LB data collection and data distribution. In other embodiments, however, a VM manager is a process that one or more controllers in the DCS controller set 825 execute.

The process 900 also transitions to 925 when it determines (at 915) that no content server needs to be added to or removed from a CS set. At 925, the process determines whether the time has reached for it to distribute DCS filter configuration data, membership update and/or global statistics to one or more agents executing on one or more hosts. The DCS filter configuration data is different in different embodiments. For example, as mentioned above, the DCS filter configuration in some embodiments includes the CS set identifiers and associated content type for each identified CS set.

In some embodiments, the process 900 distributes DCS filter configuration data, membership updates and/or global statistics on a periodic basis. In other embodiments, however, the process 900 distributes DCS configuration data, membership update and/or global statistics for the CS set whenever this data is modified. When the process determines (at 925) that it does not need to distribute new data, it transitions to 930 to determine whether it has received any more statistic, membership updates, or DCS configuration data for which it needs to update its records. If so, the process transitions back to 910 to process DCS filter configuration data, the newly received statistic, and/or membership updates. If not, the process transitions back to 925 to determine again whether it should distribute new data to one or more agents.

When the process determines (at 925) that it should distribute membership update(s) DCS filter configuration data and/or global statistics, it distributes (at 935) this data to one or more agents that need to process this data to specify and/or update the DCS filter configuration data and/or load balancing rules that they maintain for their DCS filters and/or load balancers on their hosts. After 935, the process determines (at 940) whether it has to process DCS filter configuration data, or process new statistic or membership data. If not, the process remains at 940 until it determines that it needs to process new DCS filter configuration data and/or process new statistics or membership data, at which time it transitions back to 910 to process the DCS filter configuration data, new statistics and/or membership updates.

In the embodiments described above by reference to FIG. 9, the controller set distributes global statistics to the agents, which analyze this data to specify and/or adjust the DCS configuration data and/or LB rules that they maintain. In other embodiments, however, the controller set analyzes the global statistics that it gathers, and based on this analysis specifies and/or adjusts DCS configuration data or LB rules, which it then distributes to the agents 615, DCS filters 630 or load balancers 620.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
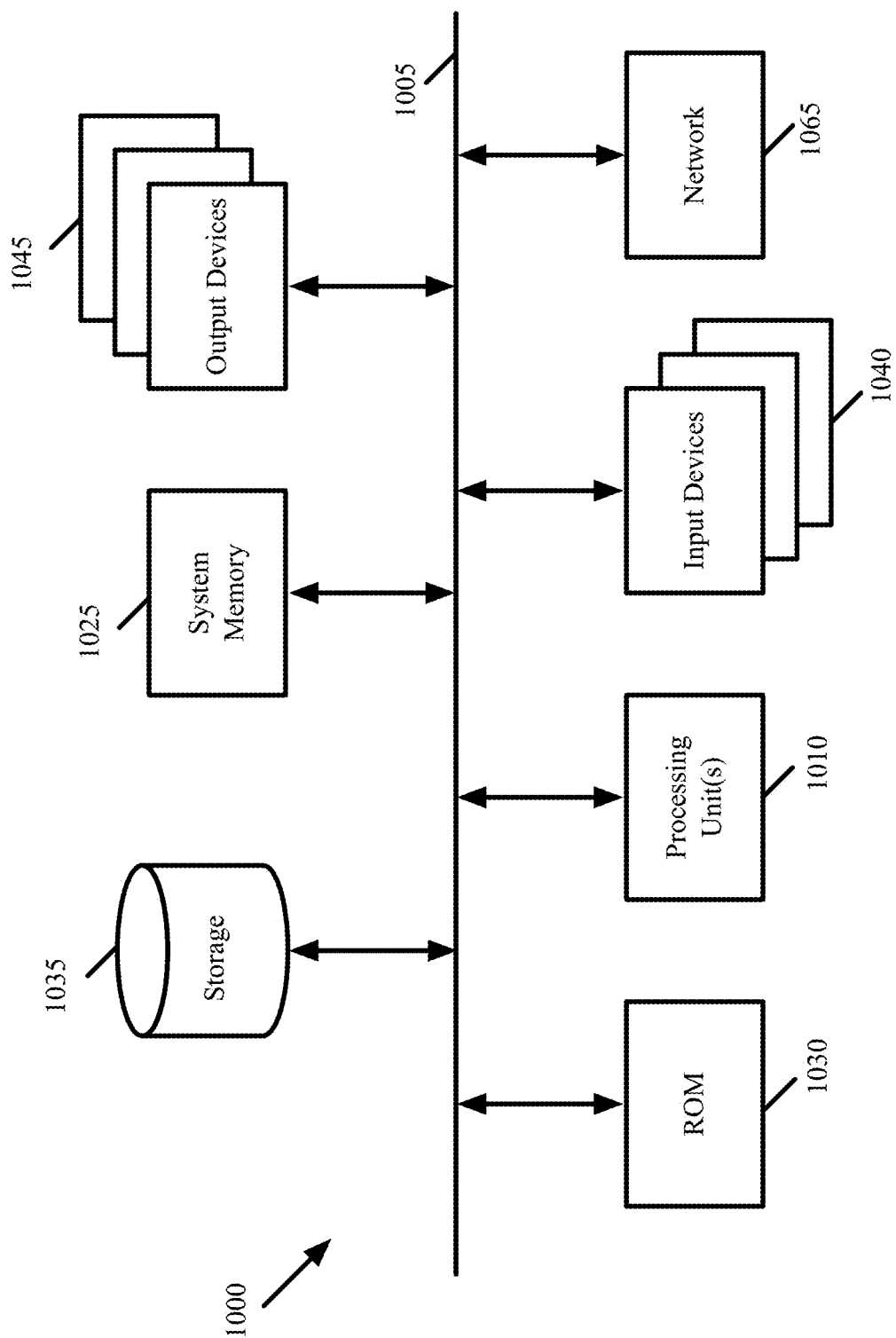
FIG. 10 conceptually illustrates an electronic system 1000 with which some embodiments of the invention are implemented.

FIG. 10 conceptually illustrates an electronic system 1000 with which some embodiments of the invention are implemented. The electronic system 1000 can be used to execute any of the control, virtualization, or operating system applications described above. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieves instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieves instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD- R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of distributing requests for content that are processed by a plurality of servers executing on a plurality of physical host computers, the plurality of servers comprising a plurality of sub-groups of servers for processing different types of content, the method comprising:
   at a content switch executing on a first host computer on which a first server in a first sub-group of servers executes,
      receiving a request for a particular type of content directed to the first server;
      determining that the request is inappropriately directed to the first server because the first server should not process requests for the particular type of content;
      determining that a second sub-group of servers should process requests for the particular type of content; and
      redirecting the request to a second host computer on which a second server in the second sub-group executes, by modifying a destination network address of the request from a first address associated with the first server to a second address associated with the second server.

2. The method of claim 1, wherein the request is a first request, wherein the particular type of content is a first type of content, the method further comprising:
   at the content switch executing on the first host computer,
      receiving a second request for a second type of content that is directed to the first server;
      determining that the first sub-group of servers should process requests for the second type of content; and
      forwarding the second request to the first server on the first host computer to process the second request.

3. The method of claim 1 further comprising:
   establishing a layer four connection with the source of the request; and
   from the source, receiving a data message comprising a payload that identifies that the requested content is of the particular content type.

4. The method of claim 3, wherein the payload comprises a URL (Uniform Resource Locator) that specifies the type of the requested content, the method further comprising:
   from the data message, extracting the URL; and
   using the extracted URL to identify the type of the requested content.

5. The method of claim 1, wherein the second sub-group of servers comprises a plurality of servers, the method further comprising:
   selecting the second server in the second sub-group of servers by performing a load balancing operation at the content switch executing on the first host computer, wherein the load balancing operation is based on a set of load-balancing criteria that is defined to spread the load on the plurality of servers in the second sub-group in a particular manner,
   wherein redirecting the request to the second host computer comprises redirecting the request to the selected server in the second sub-group of servers, wherein the selected server executes on the second host computer.

6. The method of claim 1, wherein the particular type of content is a first type of content, the method further comprising:
   at the content switch executing on the first host computer,
      receiving, for the first server in the first sub-group of servers, a plurality of requests for a plurality of types of content;
      forwarding, to the first server, content requests for a second type of content that the first sub-group of servers should process; and
      redirecting, to other sub-groups of servers, content requests for other content types that the first sub-group of servers should not process.

7. The method of claim 6 further comprising:
   at the content switch executing on the first host computer,
      collecting statistics regarding content requests redirected to the other sub-groups of servers; and
      providing the collected statistics to a controller to adjust criteria for distributing content to other content servers.

8. The method of claim 1, wherein the content switch on the first host computer is a filter module that executes on the first host computer and that is called by another module in an ingress datapath of the first server.

9. The method of claim 1, wherein the first address associated with the first server is a MAC (media access control) address of the first server, and the second address associated with the second server is a MAC address of the second server.

10. The method of claim 1, wherein the first address associated with the first server is an IP (Internet Protocol) address of the first server, and the second address associated with the second server is an IP address of the second server.

11. The method of claim 1, wherein the first address associated with the first server is an IP (Internet Protocol) address of the first host computer on which the first server executes, and the second address associated with the second server is an IP address of the second host computer on which the second server executes.

12. The method of claim 1, wherein the second address associated with the second server is an address associated with a tunnel between the first host computer on which the first server executes and the second host computer on which the second server executes.

13. A non-transitory machine readable medium storing a content-switching program for distributing requests for content that are processed by a plurality of servers executing on a plurality of physical host computers, the plurality of servers comprising a plurality of sub-groups of servers for processing different types of content, the content-switching program for execution by at least one processing unit of a first host computer, the content-switching program comprising sets of instructions for:
receiving a request for a particular type of content directed to a first server that executes on the first host computer and that belongs to a first sub-group of servers;
determining that the request is inappropriately directed to the first server because the first server should not process requests for the particular type of content;
determining that a second sub-group of servers should process requests for the particular type of content; and
redirecting the request to a second host computer on which a second server in the second sub-group executes, by modifying a destination network address of the request from a first address associated with the first server to a second address associated with the second server.

14. The non-transitory machine readable medium of claim 13, wherein the request is a first request, wherein the particular type of content is a first type of content, wherein the content-switching program further comprises sets of instructions for:
receiving a second request for a second type of content that is directed to the first server;
determining that the first sub-group of servers should process requests for the second type of content; and
forwarding the second request to the first server on the first host computer to process the second request.

15. The non-transitory machine readable medium of claim 13, wherein the content-switching program further comprises sets of instructions for:
establishing a layer four connection with the source of the request; and
from the source, receiving a data message comprising a payload that identifies that the requested content is of the particular content type.

16. The non-transitory machine readable medium of claim 15, wherein the payload comprises a URL (Uniform Resource Locator) that specifies the type of the requested content, the content-switching program further comprises sets of instructions for:
extracting the URL from the data message; and
using the extracted URL to identify the type of the requested content.

17. The non-transitory machine readable medium of claim 13, wherein the second sub-group of servers comprises a plurality of servers, the content-switching program further comprising a set of instructions for selecting the second server in the second sub-group of servers,
wherein the set of instructions for redirecting the request to the second host computer comprises a set of instructions for redirecting the request to the selected server in the second sub-group of servers, wherein the selected server executes on the second host computer.

18. The non-transitory machine readable medium of claim 17, wherein the set of instructions for selecting the second server in the second sub-group of servers comprises a set of instructions for performing a load balancing operation based on a set of load balancing criteria that is defined to spread the load on the plurality of servers in the second sub-group in a particular manner.

19. The non-transitory machine readable medium of claim 18, wherein the load balancing criteria is defined to evenly spread the load on the plurality of servers in the second sub-group.

20. The non-transitory machine readable medium of claim 13, wherein the particular type of content is a first type of content, wherein the content-switching program further comprises sets of instructions for:
receiving, for the first server in the first sub-group of servers, a plurality of requests for a plurality of types of content;
forwarding, to the first server, content requests for a second type of content that the first sub-group of servers should process; and
redirecting, to other sub-groups of servers, content requests for other content types that the first sub-group of servers should not process.

21. The non-transitory machine readable medium of claim 20, wherein the content-switching program further comprises sets of instructions for:
collecting statistics regarding content requests redirected to the other sub-groups of servers; and
providing the collected statistics to a controller to adjust criteria for distributing content to other content servers.

22. The non-transitory machine readable medium of claim 13, wherein the content switching program is a filter module that is called by another module in an ingress datapath of the first server.

* * * * *